(12) United States Patent
Gui et al.

(10) Patent No.: US 11,320,594 B2
(45) Date of Patent: May 3, 2022

(54) OPTICAL SYSTEM COMPRISING CHLORINE DOPED MODE FIELD EXPANDED OPTICAL FIBERS

(71) Applicant: CORNING INCORPORATED, Corning, NY (US)

(72) Inventors: Dong Gui, San Jose, CA (US); Pushkar Tandon, Painted Post, NY (US); Qijun Xiao, Fremont, CA (US)

(73) Assignee: Corning Incorporated, Corning, NY (US)

( * ) Notice: Subject to any disclaimer, the term of this patent is extended or adjusted under 35 U.S.C. 154(b) by 64 days.

(21) Appl. No.: 17/010,169

(22) Filed: Sep. 2, 2020

(65) Prior Publication Data

US 2021/0072462 A1    Mar. 11, 2021

Related U.S. Application Data

(60) Provisional application No. 62/896,106, filed on Sep. 5, 2019.

(51) Int. Cl.
| | |
|---|---|
| *G02B 6/26* | (2006.01) |
| *C03C 13/04* | (2006.01) |
| *G02B 6/42* | (2006.01) |
| *G02B 6/02* | (2006.01) |

(52) U.S. Cl.
CPC ............ *G02B 6/262* (2013.01); *C03C 13/046* (2013.01); *G02B 6/02009* (2013.01); *G02B 6/02376* (2013.01); *G02B 6/421* (2013.01); *G02B 6/4214* (2013.01)

(58) Field of Classification Search
CPC .... G02B 6/262; G02B 6/421; G02B 6/02376; G02B 6/4214; G02B 6/02009; G02B 6/4203; G02B 6/14; C03C 13/046; C03C 13/042; C03C 25/1061; C03C 2201/11; C03C 3/06

See application file for complete search history.

(56) References Cited

U.S. PATENT DOCUMENTS

| | | | |
|---|---|---|---|
| 10,429,589 B2 * | 10/2019 | Bookbinder | G02B 6/3833 |
| 2018/0224607 A1 * | 8/2018 | Bookbinder | C03B 32/00 |
| 2021/0072462 A1 * | 3/2021 | Gui | C03C 25/1061 |

OTHER PUBLICATIONS

Shiraishi et al., "Beam expanding fiber using thermal diffusion of the dopant", Journal of Lightwave Tech, vol. 8, No. 8, 1990, pp. 1151-1161.

* cited by examiner

*Primary Examiner* — Andrew Jordan
(74) *Attorney, Agent, or Firm* — Svetlana Z. Short

(57) ABSTRACT

An optical system comprising: an optical assembly having a first optical surface and a rear optical surface, said optical assembly comprising at least three optical elements; an optical fiber comprising a core portion with a mode field diameter (MFD) expanded region optically coupled to the rear optical surface of the optical assembly, the optical fiber comprising a core region doped with chlorine in a concentration greater than 0.5 wt %, wherein the MFD expanded region is less than 5 cm in length, and has MFD at the fiber end coupled to the optical assembly that is a least 20% greater than the MFD at other end of the optical fiber; an optical signal source coupled to first optical surface of the optical assembly, such that the optical signal provided by the optical signal source is routed along an optical path formed by the optical assembly to the mode field diameter expanded region of said optical fiber.

22 Claims, 18 Drawing Sheets

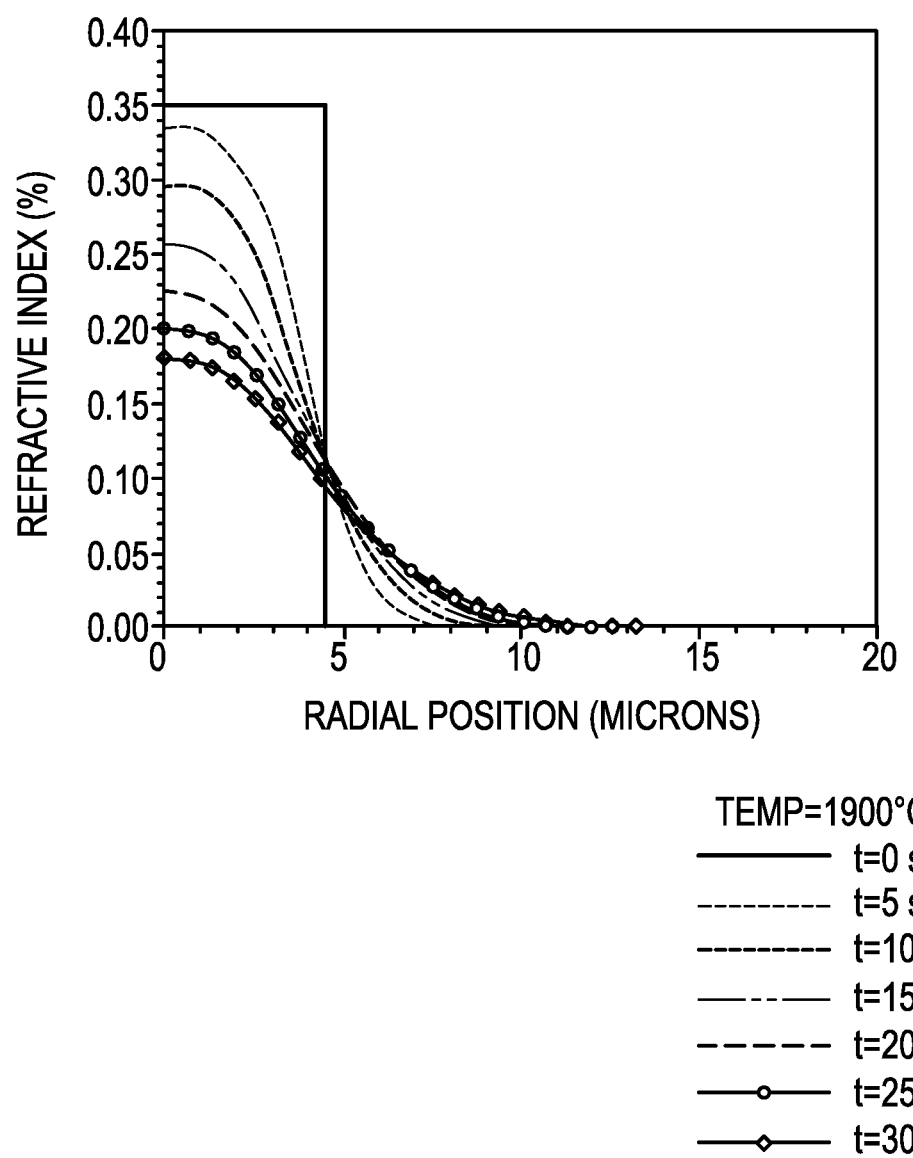

OPTICAL SYSTEM COMPRISING CHLORINE DOPED MODE FIELD EXPANDED OPTICAL FIBERS

CROSS-REFERENCE TO RELATED APPLICATIONS

This application claims the benefit of priority under 35 U.S.C § 119 of U.S. Provisional Application Ser. No. 62/896,106 filed Sep. 5, 2019 the content of which is relied upon and incorporated herein by reference in its entirety.

BACKGROUND

The disclosure relates generally to the optical systems coupled to the optical fibers and more particularly to an optical system utilizing an optical fiber with an expanded Mode Field Diameter ("MFD") coupled to an optical assembly.

A number of optical systems comprised of "free space" optical assemblies and/or optical assemblies for micro-optics applications, (e.g., optical collimators, wavelength division multiplexing assembly, etc.) provide an output signal that needs to be coupled to a standard optical fiber. For example, optical assemblies comprising optical elements such as mirrors, lenses, optical signal routers, or filters are used to route the optical signal from one part of the optical assembly to another. One end of the optical assembly may be connected to an optical source (e.g., laser diode) with the optical signal collected at the other end of the optical assembly and coupled to the optical fiber. As the optical signal is transported from one end of the optical assembly to the other, it interacts with multiple optical elements along the way. FIG. 1 illustrates a conventional optical system design that includes a free space assembly of five optical elements E1-E5 (i.e., an assembly of five optical elements E1-E5 that are air spaced from one another). In the optical system of FIG. 1 the optical signal is transported from the source (laser diode LD) to a single mode optical fiber F via an optical assembly comprising five intermediate optical elements E1-E5 situated along the optical path.

A typical single mode optical fiber F has a very small core diameter and the optical signal collected or processed by the optical system needs to be provided to the optical fiber at the precise location where the fiber core FC is situated. Thus, the optical signal output beam provided from the optical assembly to the fiber needs to have a very small diameter intersect the fiber core with very high accuracy. Signal light that misses the fiber core results in the loss of optical system performance. For example, any misalignment in the optical elements results in a loss of the signal and thus negatively impacts the optical assembly performance. However, precise alignment requirements increase the assembly time and result in additional expense.

A key issue for cost sensitive applications is to efficiently and inexpensively couple optical systems and/or optical assemblies of multiple optical elements to an optical fiber. Therefore, there is a need for optical systems that provide efficient coupling between optical assemblies that include laser(s) or similar signal light sources and multiple optical elements to single mode fiber with low cost.

No admission is made that any reference cited herein constitutes prior art. Applicant expressly reserves the right to challenge the accuracy and pertinency of any cited documents.

SUMMARY

One embodiment of the disclosure relates to an optical system comprising:

(i) an optical assembly comprising a first optical surface and a rear optical surface, said optical comprising at least three optical elements, (ii) an optical fiber comprising a core portion with a tapered core region (e.g., a mode field expanded region) optically coupled to the rear optical surface of the optical assembly, the optical fiber comprising a core region doped with chlorine in a concentration greater than 0.5 wt %, and wherein the mode field expanded region is less than 5 cm in length, the optical fiber having, at an operating wavelength k, a mode field diameter at the fiber end coupled to the optical assembly that is a least 20% greater than the optical fiber mode field diameter at other end of the optical fiber; and (iii) an optical signal source coupled to the first optical surface of the optical assembly, such that the optical signal provided by the optical signal source is routed along an optical path formed by the optical assembly to the field expanded region of said optical fiber.

According to some embodiments, an optical system comprises:

(A) an optical fiber comprising: a length L, a first end face and a second end face, and a MFD at the first end face of the fiber that is different from a MFD at another region of the fiber, the fiber further comprising:

(I) a first Cl doped silica based core comprising:
(a) a first Cl doped core region having a maximum refractive index $\Delta_0$ such that $0.05\% \leq \Delta_0 \leq 0.6\%$ (relative to undoped silica), and an outer core diameter Do, wherein 5 microns$\leq D_0 \leq$12 microns, said first Cl doped core region having maximum Cl concentration [Cl], where 0.5 wt. %$\leq$[Cl]$\leq$5 wt. %; and
(b) a Cl doped tapered core region situated adjacent to the first Cl doped core region and to the first fiber end face, the Cl doped tapered core region having a length $L_2$ where 0.05 mm$\leq L_2 \leq$5 cm, and a maximum core refractive index $\Delta c$ that decreases along the length of the tapered core region, the tapered region having an outer diameter that changes along the length $L_2$ and a maximum diameter $D_{max}$, such that $$D_{max} \geq D_0 + 3 \text{ microns;} \quad (i)$$

$$8 \text{ microns} \leq D_{max} \leq 70 \text{ microns; and} \quad (ii)$$

(II) a silica based cladding surrounding the Cl doped silica based core;

(B) an optical assembly comprising a plurality of optical elements coupled to the Cl doped tapered core region of the optical fiber;

(C) another optical fiber coupled to said first Cl doped core region.

According to some embodiments 0.05 mm$\leq L_2 \leq$30 mm,

According to some embodiments 0.05 mm$\leq L_2 \leq$10 mm,

In some embodiments the tapered core region has a taper profile, the tapered profile having: a linear taper, a parabolic taper, an exponential taper, or a Gaussian taper. In some embodiments tapered core region has an adiabatic taper and satisfies the following condition:

$$\frac{dD}{dz} \leq \frac{D}{\lambda}(n_{eff} - n_{cl})$$

where D is the core diameter at a position z within the tapered core region, $\lambda$ is the operating wavelength, $n_{eff}$ is the effective index of the fundamental mode, and $n_{cl}$ is the refractive index of the cladding. According to some embodiments 800 nm<λ<1580 nm. In some embodiments λ=1310 nm. In some embodiments λ=1550 nm. In some embodiments λ=980 nm.

In some embodiments the tapered core region has a substantially adiabatic taper and satisfies the following condition $$\frac{dD}{dz} \leq 2\frac{D}{\lambda}(n_{\mathit{eff}} - n_{cl})$$

In some embodiments the maximum concentration of Cl in the core is between 1.1 wt. % and 5 wt. %. In some embodiments the core comprises at least one region with maximum Cl concentration between 1.4 wt. % and 5 wt. %.

In some embodiments 0.0%≤|Δc (at $D_{max}$)|≤0.3%, relative to undoped silica, for example wherein 0.0%≤|Δc (at $D_{max}$)|≤0.2%.

In some embodiments the length $L_2$ is less than 3 cm. In some embodiments $L_2$ is 0.05 mm to 30 mm, in some embodiments 0.1 mm to 30 mm, in some embodiments 0.5 mm to 20 mm, and in some embodiments 1 mm to 2 cm. In some embodiments the length $L_2$ is less than 10 mm, for example $L_2$ may be 0.1 mm to 10 mm.

According to at least some of embodiments the cladding is an F doped silica based cladding. According to some embodiments the maximum F concentration in the fiber cladding is 1 wt %. According to some embodiments the maximum F concentration in the fiber cladding is, for example, 0.05 wt % to 0.75 wt %.

According to some embodiments the Cl doped tapered core region has an adiabatic taper.

According to some embodiments the tapered core region has a taper induced loss of ≤0.2 dB at 1550 nm. According to some embodiments the tapered core region has a taper induced loss of ≤0.2 dB at 1310 nm. According to some embodiments the tapered core region has a taper induced loss of ≤0.1 dB at 1310 nm.

According to some embodiments the refractive index delta Δc at a location corresponding to the maximum diameter maximum $D_{max}$ is about −0.2% to about 0.8% relative to pure silica (i.e., −0.2%≤Δc (at $D_{max}$)≤0.8%). According to some embodiments the refractive index delta Δc at a location corresponding to the maximum diameter maximum $D_{max}$ is ≤0.4% (i.e., Δc (at $D_{max}$)≤0.4%, relative to undoped silica. According to some embodiments, |Δc (at $D_{max}$)|≤0.2% relative to undoped (pure) silica. According to some embodiments, |Δc (at $D_{max}$)|≤0.15% relative to undoped (pure) silica. According to other embodiments, |Δc (at $D_{max}$)|≤0.1%, relative to undoped (pure) silica. According to some embodiments, 0%≤Δc (at $D_{max}$)|≤0.3%, relative to undoped silica. In some embodiments 0.0%≤|Δc (at $D_{max}$)|≤0.2%, %, relative to undoped silica. According to some embodiments 0.15%≤[$Δ_0$−Δc (at $D_{max}$)]≤0.37%.

According to some embodiments the cladding is an F doped cladding and |Δc (at $D_{max}$)|≤0.2% relative to pure silica. According to some embodiments the cladding is an F doped cladding, and |Δc (at $D_{max}$)|≤0.15% relative to pure silica.

According to some embodiments the optical an optical system comprises:
(a) a light source,
(b) an optical assembly comprising a plurality of optical elements, said optical assembly coupled to the light source (c) an optical fiber comprising a core with a tapered core region coupled to said optical assembly, the tapered core region comprising Cl and having an outer diameter Dc that changes along the length $L_2$ of the tapered core region and a maximum outer diameter $D_{max}$ such that 8 microns≤$D_{max}$≤70 microns; the tapered core region further comprising a maximum core refractive index Δc that decreases along the length $L_2$ of the tapered core region; said fiber further comprising a silica based cladding surrounding the core; and (c) a single mode fiber optically coupled to the optical fiber comprising a tapered core region.

According to some embodiments optical assembly comprises at least 3 optical elements and said optical elements are chosen from a group comprising mirrors, lenses, optical signal router, filters or combination thereof. According to some embodiments the optical assembly comprises at least 5 optical elements and said optical elements are chosen from a group comprising mirrors, lenses, optical signal router, filters or combination thereof.

According to some embodiments the optical assembly comprises an optical collimator, and/or an optical collimator array unit; and/or optical filter device (e.g., multiport filter device), or a variable optical attenuator.

The embodiments described herein advantageously provide one or more of the following: low insertion loss; low manufacturing cost; improved yields; improved optical performance.

Additional features and advantages will be set forth in the detailed description which follows, and in part will be readily apparent to those skilled in the art from the description or recognized by practicing the embodiments as described in the written description and claims hereof, as well as the appended drawings. It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 9C illustrates the evolution of refractive index profile with exposure time at 1900° C. in a fiber having core doped with chlorine and cladding doped with chlorine and fluorine;

DETAILED DESCRIPTION

The thermally diffused expanded core method described herein uses the phenomenon of dopant diffusion in a heated fiber to expand the mode field diameter. One approach to the fusion connection of two fibers with different mode field diameters is to continuously or adiabatically vary the core diameters of one or both fibers so that the mode field diameters match at their boundaries. During the process of dopant diffusion, the core diameter becomes larger locally, and the relative refractive index difference becomes smaller locally compared to the ordinary fiber part. The result is a tapered core and thus tapered mode field diameter within the fiber. The embodiments of the method for making thermally diffused expanded core described herein provide one or more of the following advantages: it is effective for many applications, is relatively inexpensive, and can be accomplished relatively quickly and inexpensively.

Figure 1:
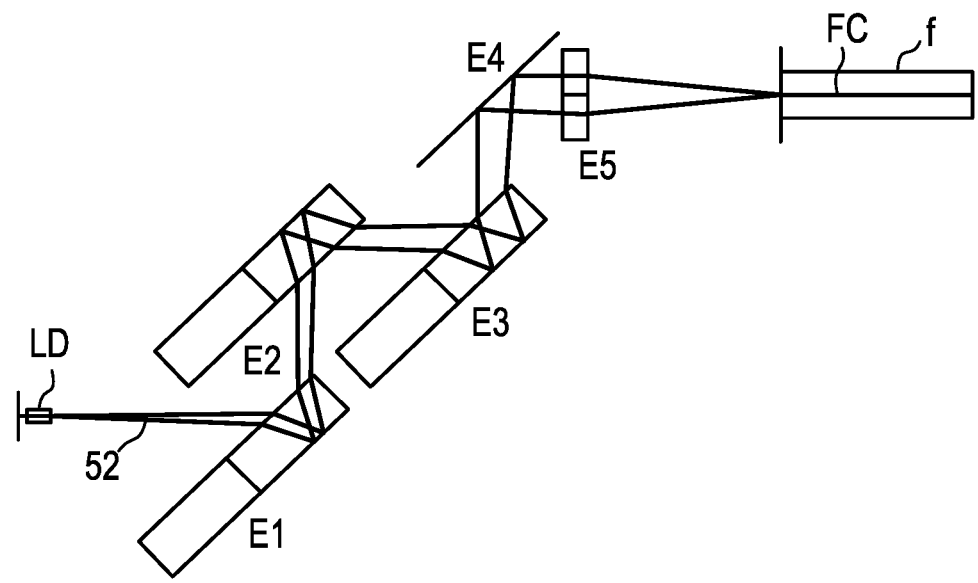
FIG. 1 is a schematic cross-sectional view a comparative optical system.
Figure 2A:
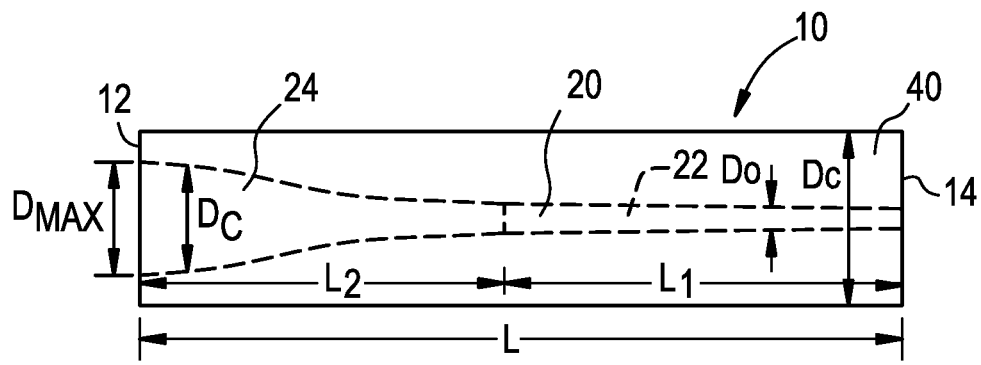
FIG. 2A is a schematic cross-sectional view of the optical fiber according to one embodiment.

FIG. 2A is an enlarged partial cross-sectional view of an expanded mode field diameter (uncoated) optical fiber 10 according to one exemplary embodiment of the present invention. This fiber has a length L and a mode field diameter on one end face (e.g., end face 12) of the fiber that is larger than the mode field diameter (MFD) at the other end face (end face 14) of the fiber. The optical fiber 10 is a "jumper" fiber for connecting a light source or an optical component of one MFD to an optical fiber with another MFD. In this embodiment the optical fiber 10 has a length L, and according to some embodiments L<100 m. Preferably L<50 m, for example 0.2 m to 20 m. In some embodiments 0.2 m≤L≤2 m. According to at least one embodiment the optical fiber 10 comprises a Cl doped silica glass core 20 and F doped silica cladding 40 surrounding the core 20. However, in other embodiments, the cladding 40 may be, for example, pure silica, or silica doped with boron.

More specifically, the optical fiber 10 includes a core 20, and a cladding (preferably with a constant outer diameter Dc) surrounding the core 20. The core 20 comprises two core regions: a constant core region 22 and tapered core region 24 situated adjacent to the constant core region. The term "constant outer diameter" as used herein refers to the fiber having an outer cladding diameter variation along the length of less than 3 microns.

The core region 22 (also referred to herein as the constant core segment, or constant core region 22) has a length $L_1$, for example $L_1 > 10$ cm (and preferably $L_1 > 12$ cm, or $L_1 > 15$ cm), a substantially constant maximum refractive index delta $\Delta_0$, and substantially constant outer diameter $D_0$ along the length $L_1$. The term "substantially constant", as used herein means that the diameter $D_0$ and the maximum refractive index delta $\Delta_0$ of the core region 22 may have small variations, i.e., variations within typical manufacturing tolerances. The core region 22 has a constant maximum refractive index. The term "constant maximum refractive index" herein refers to the fiber core having a maximum refractive index variation along the length of less than 10 percent. In some embodiments, the fiber core region 22 has a maximum refractive index variation along the length of less than 5 percent.

The tapered core region 24 of the fiber 10 has a length $L_2$ of less than 5 cm, i.e., 0 cm<$L_2$<5 cm and is situated adjacent to the first end face 12 of the fiber. In some embodiments 0.2 cm<$L_2$<3 cm. The tapered core region 24 has a changing outer core diameter Dc along its length $L_2$. In some embodiments, the fiber has an outer diameter variation along the length of less than 1 micron. In some embodiments, for example, 15 cm≤$L_1$≤50 m and $L_2$<3 cm. In some embodiments $L_2$<2 cm, for example 2 mm to 1 cm, or 2 mm to 5 mm. The tapered core region 24 has a maximum refractive index delta Δc at each position z along the length $L_2$ of the tapered region, such that Δc changes along the length $L_2$ of the tapered core region 24.

The exemplary optical fiber 10 has a constant outer cladding diameter. The term "constant outer diameter" refers to herein the fiber having an outer diameter variation along the length of less than 3 microns.

The core 20 has a maximum outer core diameter $D_{max}$ in the tapered core region 24, and an outer diameter $D_0$ in the constant region of the fiber—i.e., in the core region 22, for example, at or adjacent to the end face 14. Preferably the tapered core region 24 has an adiabatic taper—i.e., the diameter of the core Dc changes adiabatically. In other embodiments the taper profile (change in outer core diameter Dc within the tapered core region 24 along the length of the fiber) of the tapered core region 24 is linear, parabolic, or exponential. In some embodiments the taper is a Gaussian taper. The core 20 contains chlorine (Cl), and the maximum Cl concentration in the core is between 0.5 wt % and 5 wt %, for example 1 wt % to 5 wt %, or 1.1 wt % to 5 wt %, or 1.2 wt % to 5% wt %, or 1.3 wt % to 5 wt %.

In this embodiment the fiber core 20 is constructed such that: $D_{max} > D_0$. In some embodiments 5 µm $\leq D_0 \leq$ 11 µm, 8 µm $\leq D_{max} \leq$ 50 µm, 0.005% $\leq \Delta_0 \leq$ 1% (for example, 0.05% $\leq \Delta_0 \leq$ 0.6%, or 0.2% $\leq \Delta_0 \leq$ 1%), and the refractive index delta $\Delta c$ at a location corresponding to the maximum diameter maximum $D_{max}$ is smaller than $\Delta_0$. In some embodiments $\Delta c$ (at $D_{max}$) is $<\Delta_0$, for example $\Delta_c$ (at $D_{max}$)<0.940, or $\Delta c$ (at $D_{max}$)<0.8$\Delta_0$. In some embodiments $|\Delta c$ (at $D_{max}$)| is <0.7$\Delta_0$, for example $|\Delta c$ (at $D_{max}$)| is <0.540, and in some embodiments $|\Delta c$ (at $D_{max}$)| is $\leq 0.2\Delta_0$.

In some embodiments, $\Delta_0 - \Delta c$ (at $D_{max}$)>0.05%. For example, according to some embodiments $\Delta_0 - \Delta c$ (at $D_1$)$\geq$0.08%, or $\Delta_0 - \Delta c$ (at $D_{max}$)$\geq$0.1%, or $\Delta_0 - \Delta c$ (at $D_{max}$) $\geq$0.12. In some embodiments, 0.35%$\geq \Delta_0 - \Delta c$ (at $D_{max}$) $\geq$0.05%.

According to some embodiments, 10 microns/mm$\leq$ $(D_{max}-D_0)/L_2 \leq$100 microns/mm. According to some embodiments, 14 microns/mm$\leq (D_{max}-D_0)/L_2 \leq$86 microns/mm. According to some embodiments, 14 microns/mm$\leq$ $(D_{max}-D_0)/L_2 \leq$35 microns/mm.

The constant core region 22 has a mode field diameter of $MFD_0$. In some embodiments, $MFD_0$ is similar to that of standard single mode fiber, for example $MFD_0$ is between 8 to 10 µm at 1310 nm, and between 9.5 to 11.5 µm at 1550 nm. In some fiber embodiments, $MFD_0$ is smaller than standard single mode fiber, for example $MFD_0$ is between 4 to 8 µm at 1310 nm, and between 5 to 9 µm at 1550 nm.

In the tapered core region 24 the mode field diameter MFD is expanded from the mode field diameter $MFD_0$ of the constant core region 22 to a larger diameter. The fiber's maximum mode field diameter $MFD_{MAX}$ —i.e., MFD corresponding to $D_{max}$, is, for example, between 8 µm and 50 µm at 1310 nm, and between 8.5 and 50 µm at 1550 nm. The maximum MFD may be, for example, at one end of the tapered core region 24, e.g., end face 12. In the embodiments described herein $MFD_{MAX} > MFD_0$, for example $MFD_{MAX} \geq$1.5 $MFD_0$, or $MFD_{MAX} \geq$2 $MFD_0$. In some embodiments, for example, 15 $MFD_0 \geq MFD_{MAX} \geq$1.5 $MFD_0$; and in some embodiments 15 $MFD_0 \geq MFD_{MAX} \geq$2 $MFD_0$.

Figure 2B:
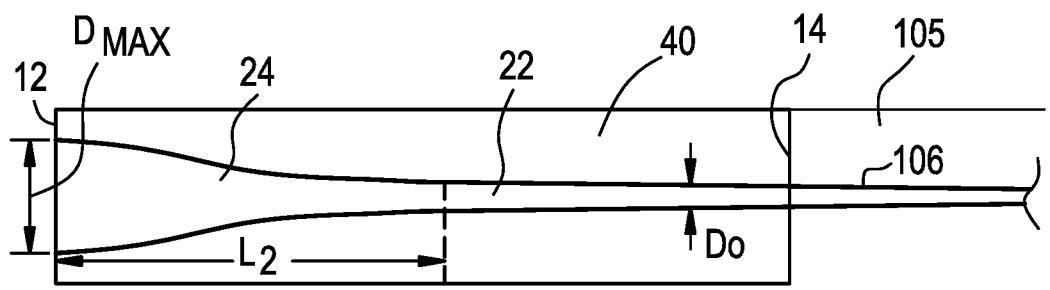
FIG. 2B illustrates schematically the optical fiber of FIG. 2A coupled to another fiber.

As shown in FIG. 2B, according to some embodiments, the end face 14 of the optical fiber 10 is coupled to an optical fiber 105. The optical fiber 105 may be a single mode fiber with a core 106, and the fibers 10 and 105 are arranged such the mode field diameter of the two fibers at adjacent end faces match one another (i.e., are substantially same, for example within plus or minus 1 µm of each other). That is, in order to enable good mode matching between the optical fiber 10 and the optical fiber 105, the core diameter of the optical fiber 105 is preferably the same or substantially the same as the core diameter of the optical fiber 10 at the end face 14 (e.g., plus or minus 1 µm of Do). Having a similar or the same outer core diameters of the fibers 10 and 105 facilitates alignment and attachment of the two optical fibers. Furthermore, because the mode field diameters at the end face 14 of the fiber 10 and the adjacent end face of the optical fiber 105 are substantially the same, there coupling loses between the optical fiber 10 and the optical fiber 105 are minimized.

Figure 2C:
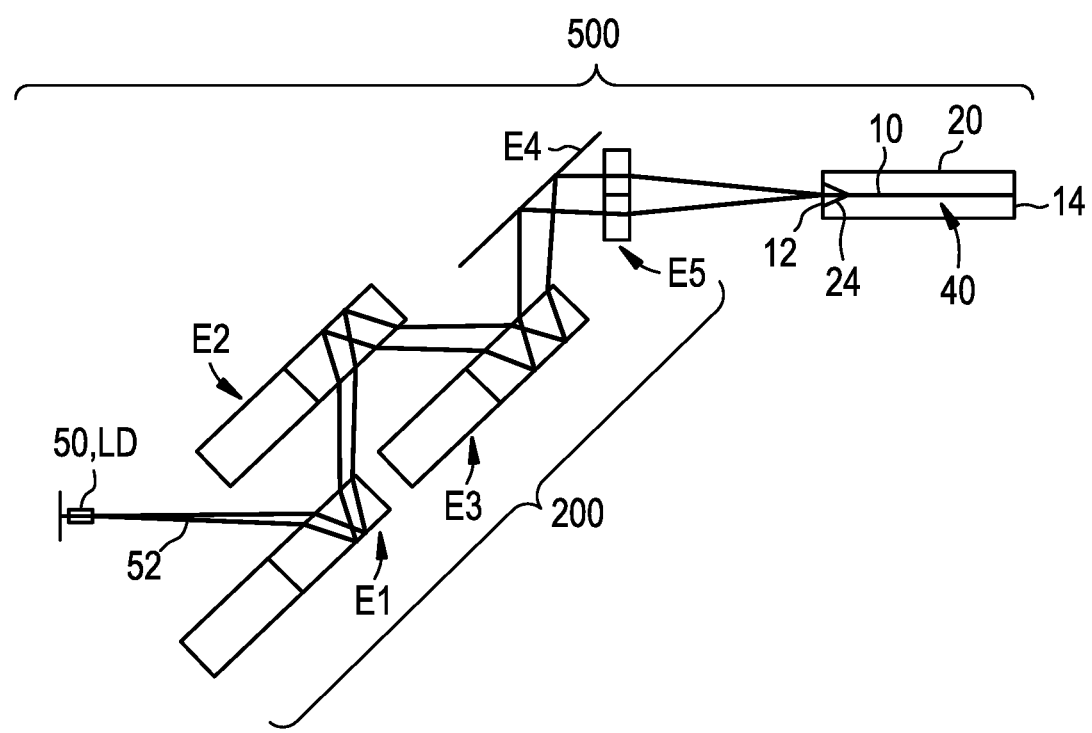
FIG. 2C illustrates a schematic cross-sectional view of an exemplary optical system for use with the optical fiber shown in FIG. 2A.
Figure 2D:
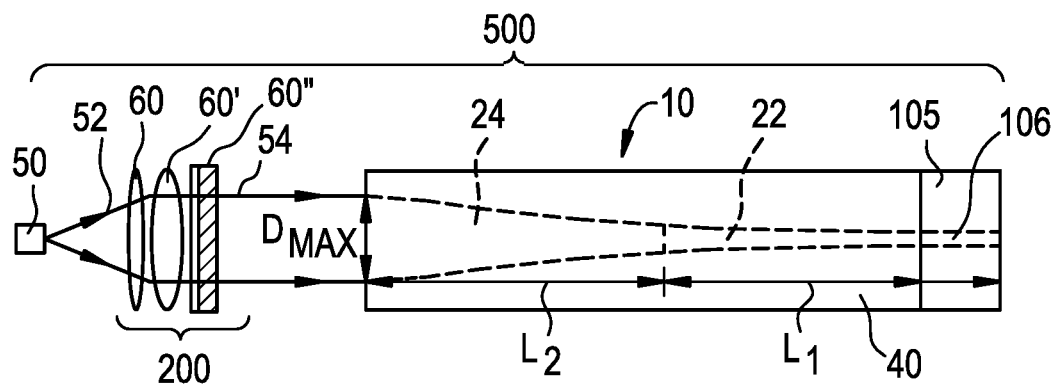
FIG. 2D illustrates a schematic cross-sectional view of another exemplary optical system for use with the optical fiber shown in FIG. 2A.

As shown in FIGS. 2C, and 2D the first end face 12 of the optical fiber 10 is coupled to the optical assembly 200, such that the signal light provided by the optical assembly enters the tapered core region 24. Since the core 20 has a maximum outer core diameter $D_{max}$ in the tapered core region 24 this enables reduction in coupling losses between the optical assembly and fiber 10, reduces (relaxes) assembly, positional or manufacturing tolerances required for the optical components of the optical assembly 200, and provides very efficient coupling between the optical assembly 200 and the optical fiber.

The core diameter ($D_{max}$) of the tapered core region 24 at the end face 12 of the fiber 10 is preferably the same, substantially the same, or larger than the laser beam diameter incident on the end face 12 of optical fiber 10. Having a large core diameter ($D_{max}$) at the end face 12 of the fiber 10 minimizes coupling loses between the optical assembly 200 and the optical fiber 10 and provides efficient coupling between the optical assembly 200 and the optical fiber 10. Having a large core diameter ($D_{max}$) at the end face 12 of the fiber 10 offers large (relaxed) spatial alignment tolerances, minimizing coupling loses between the optical assembly 200 and the optical fiber 10.

FIG. 2D illustrates an optical assembly 200 coupled to the laser source 50 (i.e., the optical signal source) such as laser diode LD and also coupled to the optical fiber 10. The optical assembly 200 comprises multiple optical components. In this embodiment, the optical assembly 200 comprises lens 60 that faces the laser source, an intermediate optical component 60' and optical component 60" that faces the optical fiber 10. As shown in FIG. 2D, in this embodiment the optical fiber 10 is coupled to the optical fiber 105. It is noted that in between the first optical component of (e.g., lens 60) the optical assembly 200 and the optical fiber 105, the signal laser beam diameter may be changed.

The tapered core region 24 of the optical fiber 10 facilitates coupling a laser source 50 to the optical assembly 200 as shown, for example, in the embodiment of FIGS. 2C and 2D. For example, as shown in FIG. 2D, to enable efficient coupling to an optical fiber through the tapered end, the laser beam 52 provided by the laser source 50 to an optical assembly 200 is collimated first by an optical component 60 to enlarge the beam diameter. Then the collimated beam 54 is coupled into the tapered core region 24 of the fiber 10 (i.e., the collimated light beam 54 is incident on the fiber end that corresponds to the core region that has a larger core diameter $D_{max}$). It is noted that the optical component 60 depicted in FIG. 2D may comprise a single lens element or a plurality of lens elements. It may include, for example, a spherical lens, an aspheric lens, a cylindrical lens, an anamorphic lens, or a GRIN lens.

The fiber 10 is designed to have numerical aperture (NA) and MFD that match those of the light source appearing in front of the fiber 10. Matched MFDs means that the mode field diameter MFD of the optical fiber's end face facing the light source appearing immediately in front of it (e.g., fiber end face that faces optical component 60 or 60' shown in FIG. 2A) is within 15%, and preferably within 10% of the MFD of that component. Having the same beam diameter provided by the optical assembly 200 to the optical fiber 10 that is smaller or the same as the core diameter $D_{max}$ of the light receiving optical fiber 10 facilitates alignment and/or coupling of optical fiber 10 to the optical assembly 200.

Figure 3:
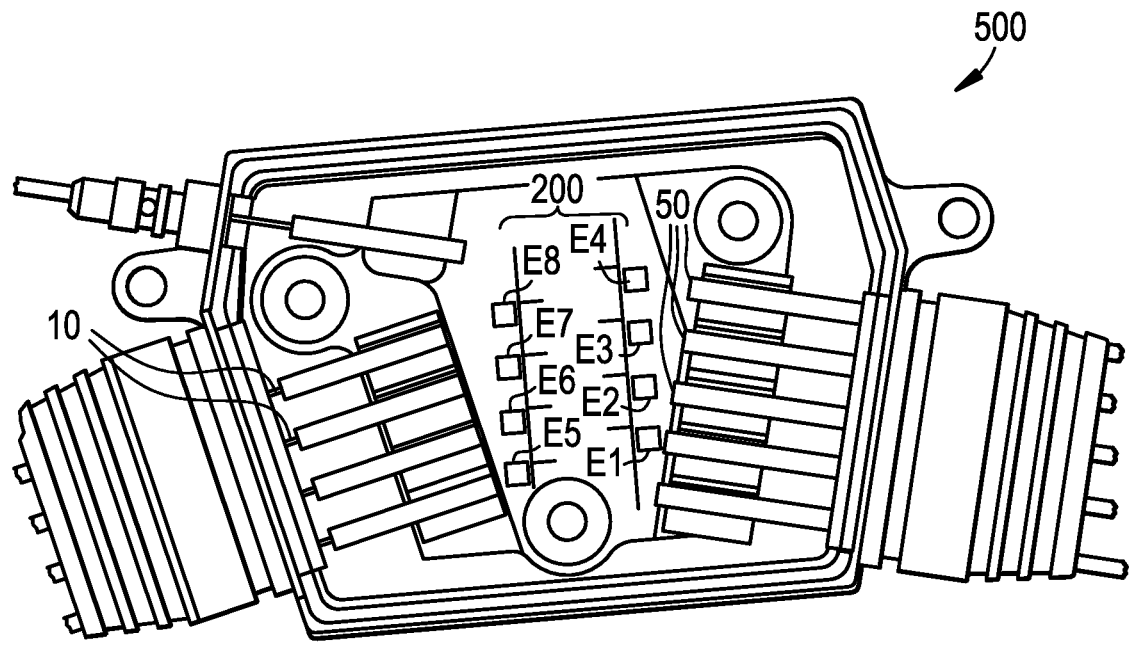
FIG. 3 illustrates a optical layout for an exemplary optical system (wave division multiplexing device) that utilizes one or more optical fiber shown in FIG. 2A and multiple optical components

FIG. 3 illustrates a schematic cross-sectional view of an exemplary optical system 500 that utilizes at least one optical fiber 10. More specifically, the optical system 500 of FIG. 3 is wave division multiplexing device that comprises an optical assembly 200 with multiple spaced-apart optical components or elements coupled to a plurality of optical fibers 10. The use of optical fibers 10 instead of typical single mode fibers F enables looser tolerances when assembling the optical components relative to one another and to the optical fibers, and higher coupling efficiency between the optical components E1, E2, etc. and the fibers 10.

Figure 4:
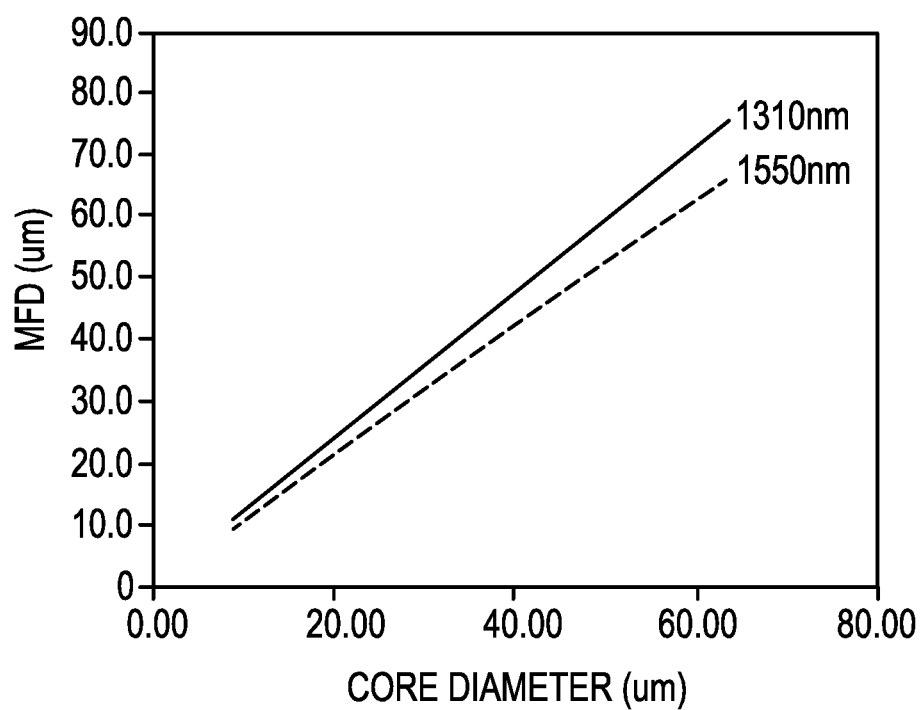
FIG. 4 illustrates the change in mode field diameter (MFD) at 1310 and 1550 nm wavelengths, in μm, as a function of the outer core diameter for the optical fiber of FIG. 1A.

FIG. 4 illustrates the change in MFD of the optical fiber 10, at 1310 nm and 1550 nm wavelengths (in μm), as a function of the outer core diameter Dc for the optical fiber 10 of FIG. 2A. Table 1 illustrates coupling coefficient and insertion loss for optical fibers 10 with different mode field diameters in the mode field expanded region. As can be see, by increasing the mode field diameter from 9.2 microns to 15 microns, the insertion loss can be decreased by about 40%. The embodiments of the optical fiber 10 disclosed herein have chlorine as a dopant in the optical fiber core, with chlorine concentration of greater than 0.5 wt %. In some other embodiments, the chlorine concentration in the optical fiber core is greater than 1 wt %. In still other embodiments, the chlorine concentration in the optical fiber is greater than 1.5 wt %.

TABLE 1

| MFD in mode field expanded region | Coupling Coefficient | Insertion Loss (dB) |
| --- | --- | --- |
| 20 micron | 0.947 | 0.233 |
| 15 microns | 0.942 | 0.257 |
| 9.2 microns | 0.909 | 0.411 |

Figure 5A:
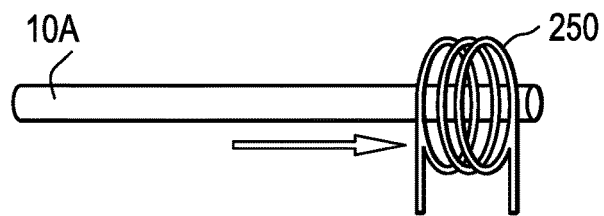
FIG. 5A illustrates schematically one method for making a tapered core fiber by a process of thermal diffusion.
Figure 5B:
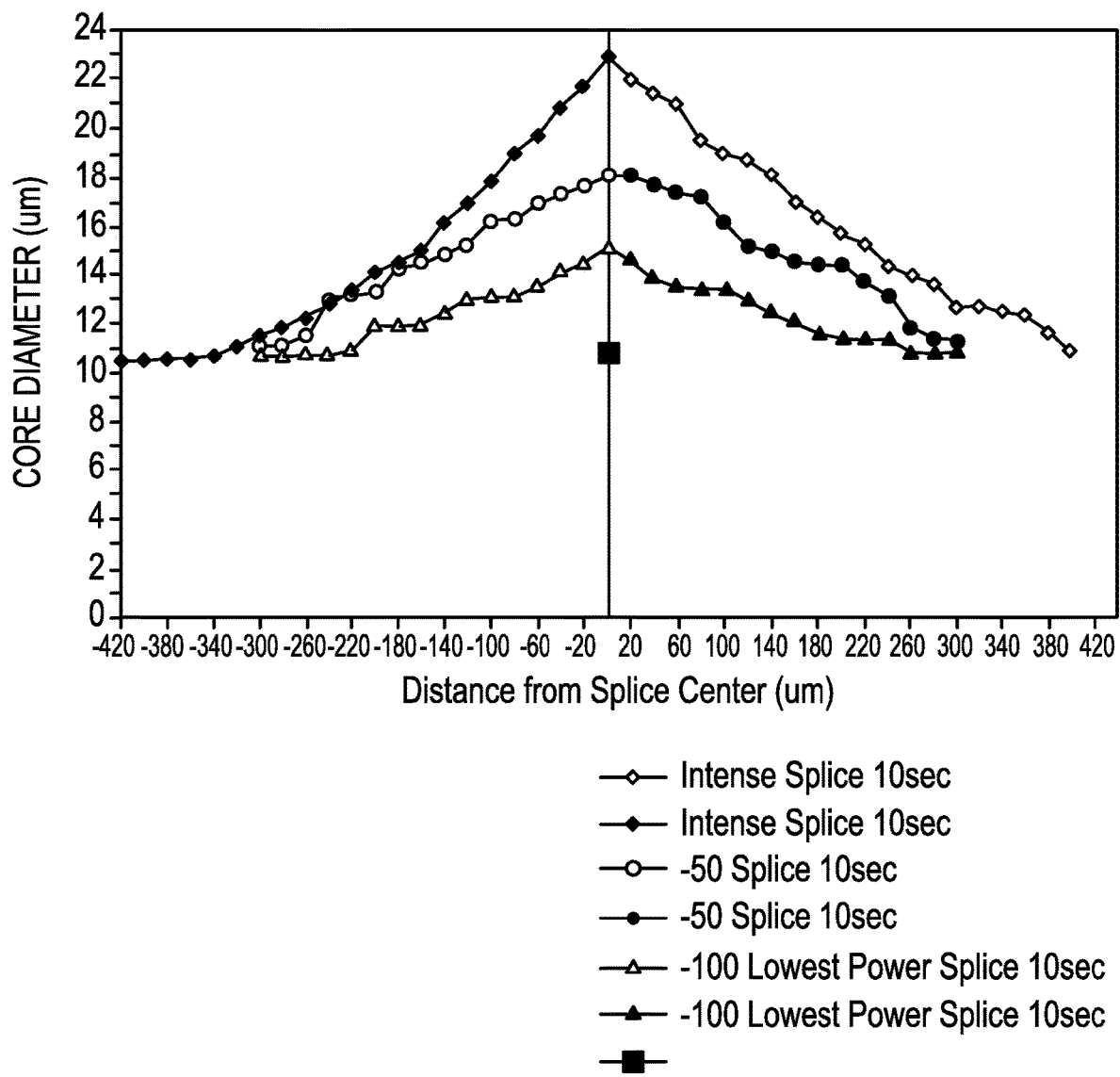
FIG. 5B illustrates mode field expansion (change in core diameter in the tapered core region) of an exemplary Cl doped $SiO_2$ fiber core, as a function of the distance (um) from the area where the heat was applied (splice center)
Figure 5C:
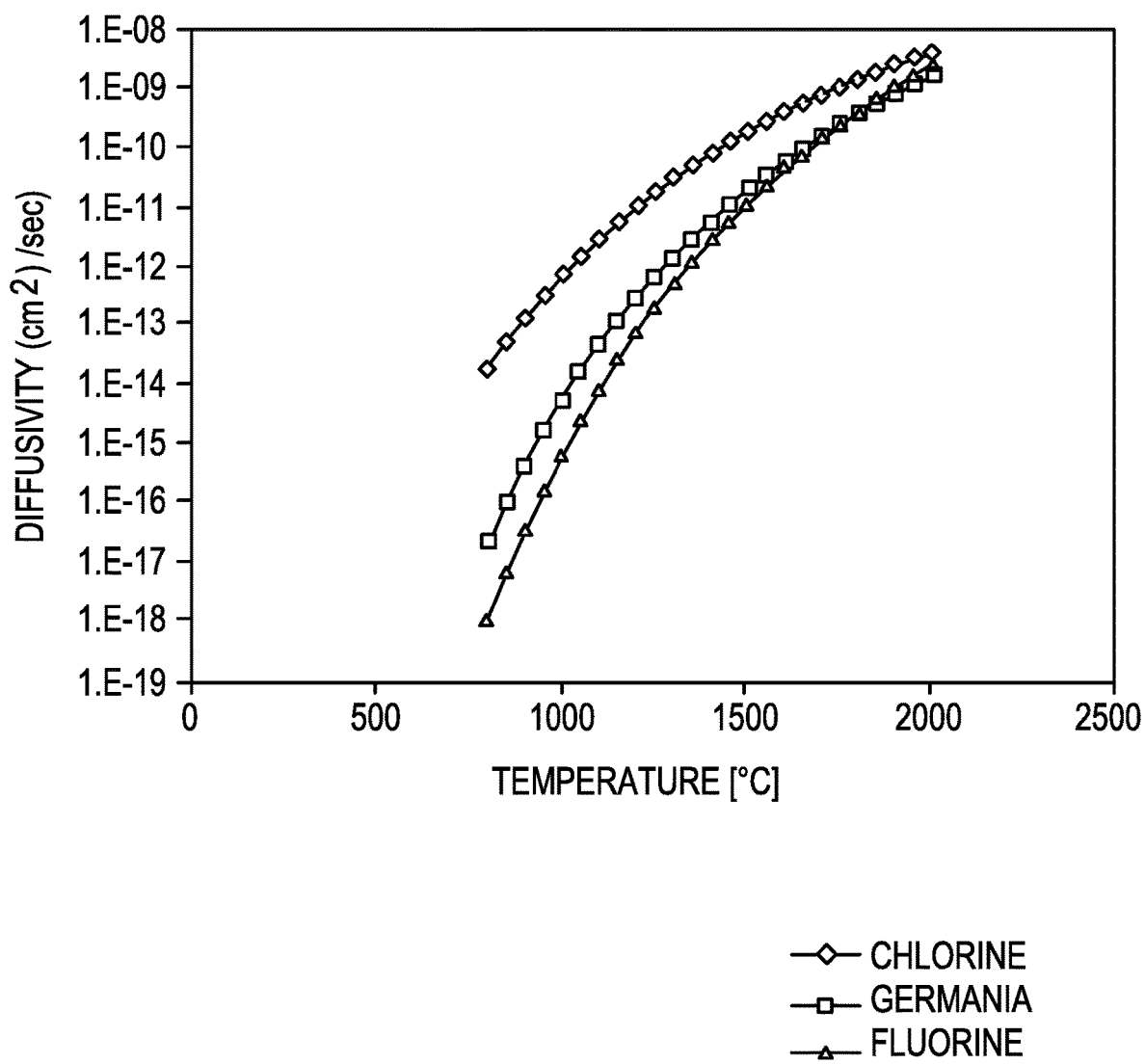
FIG. 5C illustrates diffusivity of Cl, Ge and F dopants in silica glass, as a function of glass temperature.

Optical fibers with chlorine as the core dopant are preferable for making mode field expanded optical fibers 10 because of the high chlorine diffusivity at high temperatures, for example, at temperatures greater than 1700° C., and preferably greater than 1800° C. (the higher the temperatures, the higher chlorine diffusivity). Mode field expansion can be achieved using a heat source 250, such as a heater, laser, splicer, plasma, flame, induction or combination thereof. This is shown, schematically, in FIG. 5A and is described in more detail below. FIG. 5B illustrates mode expansion in chlorine doped fiber core vs. distance from the heat source (um). More specifically, two Cl doped fiber 10 were spliced, and the heat source (at three different power levels) was directed at the splice center for 10 seconds. The highest power level corresponded to the greatest amount of heat applied to the fiber and corresponds to the upper curve. FIG. 5B shows that the core diameter Dc (and thus MFD) was largest at the locations corresponding to the splice center (distance from splice center=0 um), which is where the fiber experienced the highest temperature and highest levels of chlorine diffusions, and that the core diameter Dc decreased with the increased distance from the splice center. FIG. 5C illustrates diffusivity of Cl, Ge and F dopants in silica glass, as a function of glass temperature. FIG. 5C illustrates that at the same temperatures, diffusivity of Cl in silica-based glass is higher than the diffusivity if germania in silica based glass.

FIGS. 6A through 9C illustrate the dopant diffusion profiles, as well as refractive index profile changes as a function of time on exposure to 1900° C. temperature for several optical fibers 10 having chlorine doped cores, and will be described in more detail later in the specification.

Preferably, the core diameter taper in region 24 is designed to have an adiabatic transition to minimize the light propagation loss through the taper. That is, the mode field conversion occurs in the wider portion of the core 20 (in the tapered core region 24), and the adiabatic shape or substantially adiabatic shape of the core region 24 provides nearly lossless transmission of light. In some embodiments described herein the light loss within the tapered core region 24 is less than 1 dB, and in some embodiments less than 0.5 dB, or even 0.2 dB or less. Taper loss can be measured by standard techniques in the industry such as launching light into the core at the input end of an optical fiber and measuring light coming out of the core at the end of the fiber using a power meter and comparing it to a fiber having a taper at the end of the fiber. The change on the core diameter Dc within the adiabatic region allows the first optical mode (LP01) to be confined in the tapered core region 24, without conversion to higher-order modes, or without radiating out through the cladding, and the length of the adiabatic region (taper length $L_2$) should be long enough to achieve that purpose. Preferably, the adiabatic transition is such that that the change in core diameter satisfies the following condition:

$$\frac{dD}{dz} \leq \frac{Dc}{\lambda}(n_{\mathit{eff}} - n_{cl}) \quad (1)$$

where Dc is the core diameter in the core region 24 at location z within the length $L_2$, $\lambda$ is the transmission wavelength, $n_{\mathit{eff}}$ is the effective index of the fundamental mode LP01, and $n_{cl}$ is the refractive index of the cladding at the wavelength $\lambda$.

In some embodiments the core taper (core radius shape) is approximately adiabatic (also referred to herein as a substantially adiabatic taper), such that that the change in core diameter satisfies the following condition $$\frac{dD}{dz} \leq 2\frac{Dc}{\lambda}(n_{\mathit{eff}} - n_{cl}) \quad (2)$$

According to the embodiments described herein λ=1310 nm. However, in other embodiments λ may be 1550 nm or 980 nm.

Process for Making Tapered Core Fibers 10

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

According to some embodiments, a method of forming a tapered core in a glass optical fiber comprising a chlorine doped core surrounded by a cladding comprises the step of applying heat for a cumulative duration of less than 60 seconds (e.g., 50 seconds or less, 45 seconds or less, 30 seconds or less) to a region of the optical fiber having a mode field diameter $MFD_0$, thereby diffusing chlorine from the core of the optical fiber into the cladding of the optical fiber, and expanding the mode field diameter such that the maximum mode field diameter $MFD_{MAX}$ of the fiber (i.e., MFD corresponding to $D_{max}$) is greater than $MFD_0$, for example $MFD_{MAX} \geq 1.5 \ MFD_0$, or $MFD_{MAX} \geq 2 \ MFD_0$. In some embodiments, for example, $15 \ MFD_0 \geq MFD_{MAX} \geq 1.5 \ MFD_0$; and in some embodiments $15 \ MFD_0 \geq MFD_{MAX} \geq 2 \ MFD_0$. In some embodiments, the maximum (expanded) mode field diameter $MFD_{MAX}$ is, for example, between 8 μm and 50 μm m at 1310 nm, and between 8.5 μm and 50 μm m at 1550 nm.

According to some embodiments, a method of forming a tapered core in a glass optical fiber comprising a chlorine doped core surrounded by a cladding comprises the step of applying heat for a cumulative duration of less than 60 seconds to a region of the optical fiber, thereby diffusing chlorine from the core of the optical fiber into the cladding of the optical fiber, and expanding the mode field diameter MFD by at least 3 microns. According to some embodiments a method of forming a tapered core in a glass optical fiber comprises: (i) applying heat for a cumulative duration of less than 60 seconds to a region of the optical fiber, thereby diffusing chlorine from the core of the optical fiber into the cladding of the optical fiber, and expanding the mode field diameter MFD by at least 3 microns; and (ii) cleaving the optical fiber in the region of the fiber where the mode field MFD was expanded by at least 3 microns.

More specifically, a tapered core profile (tapered core region 24) can be made by thermal diffusion of the core dopants to the cladding and/or cladding dopants towards or into the fiber core. FIG. 5A illustrates schematically one embodiment an exemplary process for making a core region 24 of the optical fiber 10. According to this embodiment an initial fiber 10A (with constant core diameter and constant maximum core refractive index delta) is placed next to a heating element 250 to create a fiber 10 having a core region with a taper (tapered core region 24). The heating element 250 can be an electric resistant coil, a gas burner, or a laser source. According to one embodiment the optical fiber is held by a holding fixture (not shown) and the heating element surrounds the fiber 10A. Preferably the heat source heating element 250 is evenly distributed around the fiber to create a radially symmetric dopant diffusion profile. In this embodiment, the fiber end region of the fiber 10A is heated by a heating element to a desired temperature (fiber dopant diffusion temperature Td), for example 1500° C.≤Td<2200° C. We discovered that when Td<2200° C., the undesirable fiber deformation due to heat is minimized. Preferably Td≤2100° C., to avoid or minimize significant undesired deformation of the fiber. According to some embodiments, 1600° C.≤Td≤2100° C. We discovered dopant diffusion (e.g., diffusion of Cl) can occur at a very fast rate within the fiber at theses temperatures, creating the desired taper in the fiber core in fiber region 24, without the undesirable fiber deformation. For example, in some embodiments, 1700° C.≤Td≤2100° C., and in some embodiments some embodiments, 1700° C.≤Td≤2000° C. In some embodiments, the temperature Td is below the cladding glass softening point to avoid undesirable fiber deformation. The fiber moves through the hot zone (temperature Td) with a speed profile that controls the amount of dopant diffusion (out of the fiber core and/or out of the cladding) along the fiber. Alternatively, the fiber stays stationary and the heating element moves along the fiber length, for a predetermined distance. In some other embodiments, the temperature is higher than the cladding's softening point. In these embodiments, the total exposure time of the fiber portion corresponding to the core region 24 to the temperature Td is less than 1 minute in order to avoid significant undesirable deformation to the fiber (e.g., bends, or changes in the outer radius), and in some embodiments the total (or cumulative) exposure time to the temperature Td is 1 sec to 45 sec, or 1 sec to 30 sec Although the step of applying heat (subjecting the fiber to the temperature Td) may be done intermittingly or as a single continuous step, it is performed for cumulative duration of less than 60 seconds, e.g., for a total time of 1 sec to 45 sec, or even 1 sec to 30 sec.

In some embodiments the heat source (e.g., heating element 250) may be placed away from the edge of the fiber 10A—i.e., somewhere adjacent to or around the middle of the fiber 10A. In one embodiment, the optical fiber with a chlorine doped core is held by a holding fixture and the heating element 250 surrounds the fiber 10A in a middle region of the fiber. Preferably the heat source heating element 250 is evenly distributed around the fiber to create a radially symmetric dopant diffusion profile. In this embodiment, the fiber end region of the fiber 10A is heated by a heating element to a desired temperature (fiber dopant diffusion temperature Td), for example 1500° C.≤Td<2200° C. and the fiber is moved relative to the heat source (or the heat source is moved relative to the fiber, to expand the mode field diameter of the fiber core (through dopant diffusion), through dopant diffusion, in a middle region of the fiber. In some embodiments 1500° C.≤Td<2100° C., and in some embodiments 1700° C.≤Td<2100° C., for example 1500° C.≤Td<2000° C., or 1700° C.≤Td<2000° C.

FIG. 5B illustrates mode field expansion of a Cl doped $SiO_2$ core, F-doped $SiO_2$ clad optical fiber showing effect of splicing diffusion of dopant and resulting MFD vs. radial location. It was demonstrated that the mode field with chlorine as the core dopant can be expanded by as much as a factor of 2 over a distance of about 400 microns. Optical fibers with chlorine as the core dopant are ideal candidates for making mode field expanded optical fibers because of the high chlorine diffusivity at temperatures greater than 1800° C. Mode field expansion can be achieved using a heat source, such as a heater, laser, splicer, plasma, flame, induction, or combination thereof.

According to some embodiments a method of forming a low loss taper in a glass optical fiber comprising greater than 0.5 wt % chlorine in a core, the core having an initial mode field diameter MFD (at 1550 nm) and being surrounded by a cladding, comprises the steps of:

(a) expanding the initial core MFD at 15550 nm by at least 3 microns by applying heat to said optical fiber for less than 60 seconds cumulative duration, thereby diffusing chlorine from the core of the optical fiber into the cladding of the optical fiber;

(b) cleaving said optical fiber at a location where the MFD was expanded by at least 3 microns.

According to some embodiments, a method of forming an adiabatic taper or a substantially adiabatic taper in an optical fiber comprises the steps of:

aligning and abutting a cleaved end of a first optical fiber having a small MFD (e.g., MFD≥5 μm, for example between 5 μm and 11 μm, at 1550 nm) and a cleaved end of a second optical fiber having a large MFD (relative to that of the first fiber) adjacent a heat source to form a splice seam;

offsetting the splice seam a predetermined distance from the center of the heat region of the heat source;

applying heat in the heat region to splice the fibers and expand the MFDs;

monitoring the decrease in splice loss during the heating step;

terminating the application of heat when the splice loss is at or sufficiently close to a target loss;

cleaving the first optical fiber where heat from the heat source is delivered to the first optical fiber from the center of the heat region, wherein the step of applying heat (i.e., the step of maintaining the fiber at temperature Td) is less than 1 minute (total, or cumulatively) in duration, thereby diffusing one or more dopants dopant (e.g., Cl) from the core of the first and second optical fibers into the respective claddings of the first and second optical fibers.

According to another embodiment, a method of forming an adiabatic taper or a substantially adiabatic taper in an optical fiber, the method comprises the steps of: cleaving one end of an optical fiber having a small MFD (e.g., MFD≥5 µm, for example between 5 µm and ≤11 µm, at a wavelength of 1550 nm) and Cl doped core; applying heat to a segment of fiber with a predetermined length from the cleaved end by moving the fiber segment through the heat source; controlling fiber moving velocity profile to expand the MFD adiabatically from inner end of the segment towards the cleaved end, wherein the step of applying heat is performed at a temperature Td for a time t that is less than 1 minute total (cumulative) in duration. Preferably, according to some embodiments 1500° C.≤Td<2200° C. According to some embodiments 1600° C.≤Td<2100° C., and even more preferably 1800° C.≤Td<2000° C. to facilitate the optimum diffusion of dopants within the fiber core while minimizing or avoiding undesirable fiber deformations. According to some embodiments t is 45 seconds or less, or for example, 30 seconds or less, 20 seconds or less, 10 seconds or less. For example, in some embodiments, 1 second≤t≤45 seconds, 1 second≤t≤30 seconds, or 1 second≤t≤20 seconds, or even 1 second≤t≤10 seconds. According to some embodiments t is 5 to 45 sec, or 5 to 45 sec, or 5 to 30 sec.

According to another embodiment, a method of forming an adiabatic taper or a substantially adiabatic taper in an optical fiber having Cl doped core, the method comprises the steps of:

(i) removing fiber coating of a fiber segment with a predetermined length situated in the middle of the optical fiber (i.e., away from the fiber end faces);

(ii) applying heat to the fiber segment through the heat source so that the fiber segment is exposed to the temperature Td for a time t that is less than 1 minute total (cumulative) in duration and diffusing Cl from the Cl doped core;

(iii) controlling fiber moving velocity profile to expand the MFD adiabatically from both ends of the segment towards middle of the segment;

(iv) cleaving the fiber segment in the middle to form two adiabatic tapers.

In some embodiments the application of heat is provided for the time t that is 45 seconds or less, 30 seconds or less, 20 seconds or less, 10 seconds or less, or 1 to 10 seconds.

Preferably, according to some embodiments 1500° C.≤Td<2200° C. According to some embodiments 1500° C.≤Td<2100° C., and preferably 1600° C.≤Td<2100° C., 1700° C.≤Td<2000° C., or 1800° C.≤Td<2000° C. to facilitate the optimum diffusion of dopants within the fiber core within a minimum amount of time to minimize or avoid undesirable fiber deformations.

For example, a highly localized high temperature heat source, such as an arc fusion splicer (e.g., model no. FSU 975 manufactured by Ericsson Incorporated), a tungsten filament, or a $CO_2$ laser can be used to expand the mode field diameter of the optical fiber 10 and thus form the tapered core region 24 (e.g., adiabatic taper) in the Cl doped fiber core. In one embodiment, the fiber with a Cl doped core ($0.3\% \leq \Delta_0 \leq 2.5\%$, Cl concentration about 0.2 wt % to about 2.5 wt %) and silica based cladding (e.g., F doped silica cladding) is stripped of its primary coating over a portion of its length exposing a small diameter core 20 bounded by a cladding 40 and then cleaved. Another fiber 10' (with a larger mode field diameter) is then stripped of its coating, cleaved, and the two fibers (not shown) are in the fusion splicer such that the two cleaved ends face each other and the cores are in proper alignment. The arc is applied such that so that the larger portion of the smaller Cl doped fiber 10 lies the in arc region or heat region than that of the large mode field diameter fiber. That is, in this embodiment the arc region is offset from the splice seam, rather than being directly over the splice seam 50. The two fibers 10 and 10' are initially fused at splice seam by delivery of an initial arc discharge current, for example, of approximately 10 to 20 mA for an arc time of approximately 2 seconds. Additional arc discharge current is intermittently applied over the arc region to maintain the fiber temperature at the temperature Td, in order to diffuse Cl, within the core of small mode field diameter fiber 10 residing in the arc region, to create a tapered region 24. In the exemplary embodiments described herein fiber temperature is maintained at the temperature Td over a total (or cumulative) time of less than 1 minute. In some embodiments the optical fiber is subjected to temperature Td for a total of 5 sec to 45 sec. The resultant fused fiber is then cleaved, resulting in fiber 10 with Cl doped core that has a tapered region similar to that shown in FIGS. 2A and 2B. Without being bound by theory, we believe that because Cl (in the core) and F (in the cladding) both have only one bond, these dopants act synergistically, quickly moving in opposite directions and replacing one another, thus surprisingly and advantageously resulting in making the desired tapered core regions 24 at lower temperatures (<2200° C., preferably ≤2100° C., and more preferably ≤2000° C.), and faster rate than what can be achieved by fibers with Ge doped cores. However, a fiber with Cl doped core, rather than Ge dope core, can be subjected to lower temperature Td, for less than a minute (e.g., t=45 sec or less) to result in the desired tapered core region, even if the cladding 40 of fiber 10 is pure silica instead of F doped silica. That is, our models indicate that Cl diffuses in silica much faster and at lower temperatures than Ge. A short exposure (<1 min, and preferably ≤50 sec) to temperature Td minimizes the effects of undesired heat induced changes in the fiber. Thus, according to some embodiments, the silica based core 40 can be either pure silica, or (preferably) silica doped with F.

Various embodiments will be further clarified by the following examples. Table 1 discloses fiber core parameters before the fiber is subjected to a temperature Td, while Table 2 shows fiber core parameters of the tapered core region 24, after the taper is created by subjecting the fiber to the temperature Td for 1 sec to 45 seconds.

TABLE 1

| Fiber Example | Initial maximum core delta, % | Initial physical core diameter, microns | Initial MFD at 1310 nm, microns | Initial MFD at 1550 nm, microns |
| --- | --- | --- | --- | --- |
| 1 | 0.34 | 8.8 | 9.2 | 10.4 |
| 2 | 0.34 | 8.8 | 9.2 | 10.4 |
| 3 | 0.34 | 8.8 | 9.2 | 10.4 |
| 4 | 0.34 | 8.8 | 9.2 | 10.4 |
| 5 | 0.34 | 8.8 | 9.2 | 10.4 |
| 6 | 0.34 | 8.8 | 9.2 | 10.4 |
| 7 | 0.34 | 8.8 | 9.2 | 10.4 |
| 8 | 0.34 | 8.8 | 9.2 | 10.4 |
| 9 | 0.31 | 9.0 | 9.6 | 10.9 |
| 10 | 0.31 | 9.0 | 9.6 | 10.9 |
| 11 | 0.31 | 9.0 | 9.6 | 10.9 |
| 12 | 0.31 | 9.0 | 9.6 | 10.9 |
| 13 | 0.31 | 9.0 | 9.6 | 10.9 |
| 14 | 0.31 | 9.0 | 9.6 | 10.9 |
| 15 | 0.31 | 9.0 | 9.6 | 10.9 |
| 16 | 0.31 | 9.0 | 9.6 | 10.9 |
| 17 | 0.38 | 8.2 | 8.7 | 9.8 |
| 18 | 0.38 | 8.2 | 8.7 | 9.8 |
| 19 | 0.38 | 8.2 | 8.7 | 9.8 |
| 20 | 0.38 | 8.2 | 8.7 | 9.8 |

TABLE 1-continued

| Fiber Example | Initial maximum core delta, % | Initial physical core diameter, microns | Initial MFD at 1310 nm, microns | Initial MFD at 1550 nm, microns |
|---|---|---|---|---|
| 21 | 0.38 | 8.2 | 8.7 | 9.8 |
| 22 | 0.38 | 8.2 | 8.7 | 9.8 |
| 23 | 0.38 | 8.2 | 8.7 | 9.8 |
| 24 | 0.38 | 8.2 | 8.7 | 9.8 |

TABLE 2

| Example | Final maximum core delta, % | Final physical outer core diameter, microns | Final MFD at 1310 nm, microns | Final MFD at 1550 nm, microns | Maximum taper slope (microns core diameter/mm fiber length) | Minimum taper length for linear slope, mm |
|---|---|---|---|---|---|---|
| 1 | 0.12 | 14.8 | 15.6 | 17.6 | 14.5 | 0.41 |
| 2 | 0.06 | 21.0 | 22.1 | 24.9 | 14.5 | 0.84 |
| 3 | 0.04 | 25.7 | 27.0 | 30.5 | 14.5 | 1.16 |
| 4 | 0.02 | 36.3 | 38.4 | 43.3 | 14.5 | 1.90 |
| 5 | 0.015 | 41.9 | 44.1 | 49.8 | 14.5 | 2.28 |
| 6 | 0.01 | 51.3 | 54.1 | 61.0 | 14.5 | 2.93 |
| 7 | 0.008 | 57.4 | 60.5 | 68.2 | 14.5 | 3.35 |
| 8 | 0.006 | 66.2 | 67.6 | 77.6 | 14.5 | 3.96 |
| 9 | 0.12 | 14.5 | 15.5 | 17.5 | 14.0 | 0.39 |
| 10 | 0.06 | 20.5 | 21.9 | 24.8 | 14.0 | 0.82 |
| 11 | 0.04 | 25.1 | 26.8 | 30.4 | 14.0 | 1.15 |
| 12 | 0.02 | 35.4 | 37.9 | 42.9 | 14.0 | 1.89 |
| 13 | 0.015 | 40.9 | 43.8 | 49.6 | 14.0 | 2.28 |
| 14 | 0.01 | 50.1 | 53.6 | 60.7 | 14.0 | 2.94 |
| 15 | 0.008 | 56.0 | 59.9 | 67.9 | 14.0 | 3.36 |
| 16 | 0.006 | 64.7 | 67.6 | 77.6 | 14.0 | 3.98 |
| 17 | 0.12 | 14.6 | 15.5 | 17.5 | 14.1 | 0.45 |
| 18 | 0.06 | 20.6 | 21.9 | 24.8 | 15.1 | 0.82 |
| 19 | 0.04 | 25.3 | 26.9 | 30.4 | 16.1 | 1.06 |
| 20 | 0.02 | 35.7 | 38.0 | 43.0 | 17.1 | 1.61 |
| 21 | 0.015 | 41.3 | 43.9 | 49.7 | 18.1 | 1.83 |
| 22 | 0.01 | 50.5 | 53.8 | 60.8 | 19.1 | 2.22 |
| 23 | 0.008 | 56.5 | 60.1 | 68.0 | 20.1 | 2.40 |
| 24 | 0.006 | 65.3 | 67.6 | 77.6 | 21.1 | 2.70 |

The optical fibers 10 of Table 2 exhibit taper induced loss of ≤0.2 dB at 1550 nm. For example, at least in some embodiments of fiber 10 the tapered region 24 of these fibers exhibits a taper induced loss of ≤0.2 dB at 1310 nm. For example, in at least in some embodiments of fiber 10 the tapered region 24 of these fibers exhibit a taper induced loss of ≤0.1 dB at 1310 nm.

Fiber Designs for Mode Field Expansion

To make a tapered core region adjacent to one the end of an optical fiber jumper (such as fiber 10) the fiber's core refractive index in this region needs to be decreased gradually and the core diameter in this region needs to be increased gradually. This can be achieved by core dopant diffusion by heating the fiber end.

Although the Ge dopant that is used in most single mode fibers can diffuse when the fiber is heated, creating a tapered core region, in such fibers at temperatures below 2200 C° the diffusion required for adequate mode field expansion will take very long time (many minutes or hours) because the diffusion coefficient of Ge is too low, making the process inefficient and expensive. If, however, a Ge doped fiber is subjected to a relatively fast heating time (1-2 min), the fiber needs to be heated to very high temperatures—i.e., above 2200° C. or above 2300° C., or even greater (the faster heating time, the higher the temperature), which creates undesirable fiber deformation(s), for example it creates fiber bends and/or significantly changes the outer diameter of the fiber.

Applicants realized that in order to increase the diffusion speed, without significantly deforming the fiber by heating it to very high temperatures, a fiber with Cl doped core having more than 0.5 wt % Cl should be used instead of typical fiber with Ge doped core. The exemplary fiber embodiments discussed herein thus utilize a Cl doped core, because Cl can diffuse easier and faster than Ge, at lower temperatures. Preferably, according to at least some embodiments the fiber utilizes a F doped cladding, because as Cl diffuses out toward the outer diameter of the fiber, the F simultaneously diffuses inward, toward the center of the fiber, and the two dopants (Cl and F) work synergistically to facilitate the fast creation of the tapered core region at smaller temperature Td, without causing fiber deformation (i.e., no unwanted bends, or significant changes in the outer diameter of the fiber).

At the Td temperatures where Td is below 2100° C., (e.g., greater than 1500° C. and less than 2100° C., or not greater than 2000° C., for example 1500° C. to 2000° C., or 1600° C. to 2000° C., or 1700° C. to 2000° C.), Cl dopant within the fiber core diffuses through silica much faster than Ge in the comparative fibers. FIG. 5C shows the diffusivity (cm²/sec) of Cl, F, and Ge in pure silica glass for different temperatures (750° C.≤Td≤2000° C.). It is noted that at about 2100° C. chlorine's diffusivity into pure silica glass is about 2 times faster than that of germania. As shown in FIG. 5C at about 2000° C. chlorine's diffusivity into pure silica glass is about 2.4 times faster than that of germania. At 1900° C. chlorine's diffusivity into pure silica glass is about 3 times faster than that of germania. At 1700° C. chlorine's diffusivity into pure silica glass is about 5.5 times faster than that of germania. Thus, this figure illustrates that the higher the temperature, the higher is the diffusivity. In the temperatures of interest (Td<2200° C., and more preferably Td<2100° C.) Cl diffuses through silica much faster than Ge, and at that range of temperatures the fiber encounters no significant deformation(s). Accordingly, in at least some embodiments, it is preferable that 1500° C.<Td<2100° C. because and at that range of temperatures the fiber encounters essentially no undesirable deformation(s).

When the fiber is subjected to the temperature Td (e.g., 1500° C.≤Td≤2100° C.), Cl in the fiber core starts to diffuse out of the core towards and into the cladding. The diffusion of the Cl lowers the maximum refractive index of the core and simultaneously increases the core outer diameter. In the embodiments where the cladding 40 comprises fluorine, when the fiber is subjected to the temperature Td the fluorine from the cladding also starts to diffuse into from the cladding into the core, further lowering the refractive index of the core. FIGS. 6A-9C illustrate modeled changes in the chlorine and fluorine doped concentration profiles of the exemplary step index optical fibers subjected to different temperatures Td, along with the changes in corresponding changes in refractive index profiles as a result of the diffusion of chlorine and fluorine species in the glass.

Figure 6A:
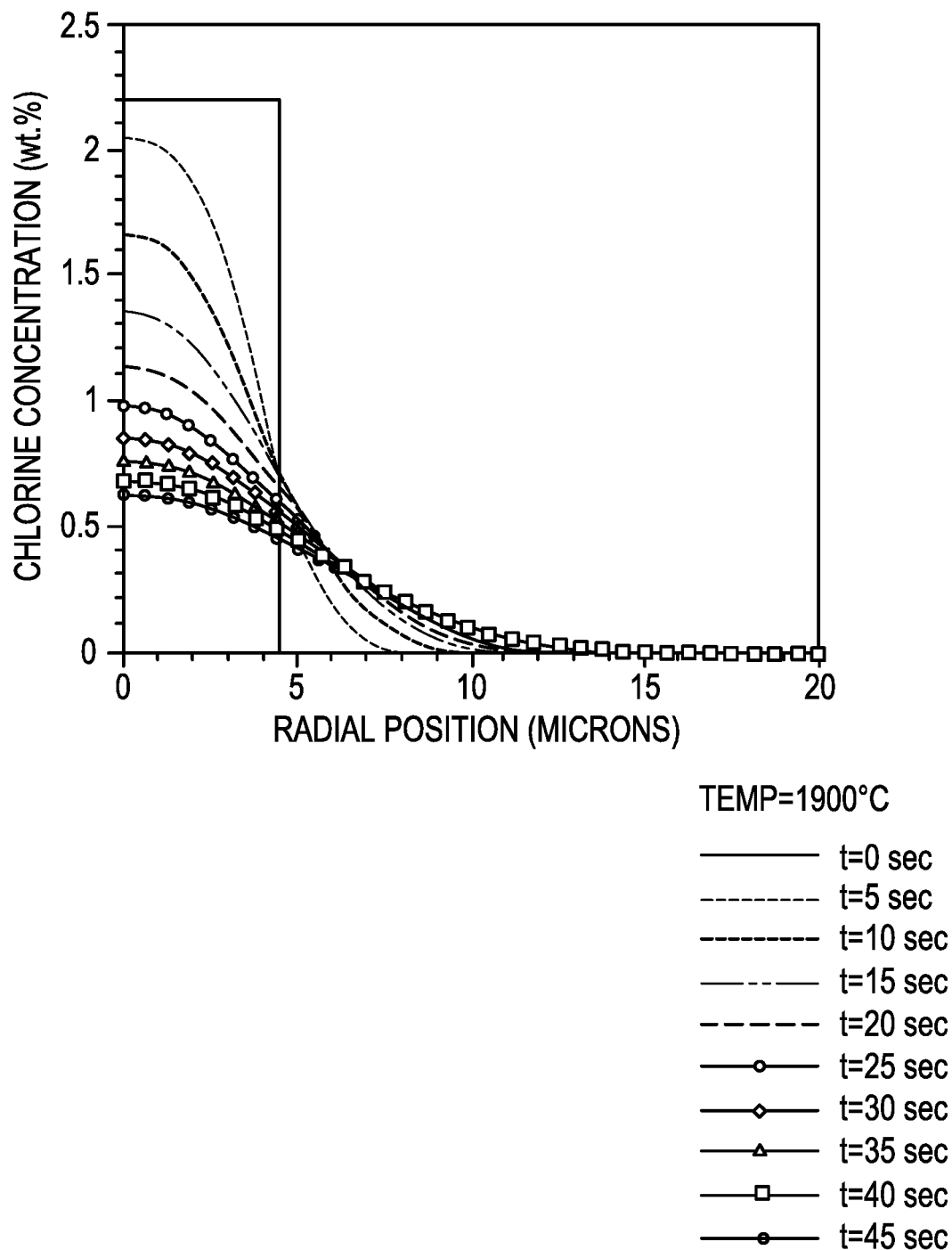
FIG. 6A illustrates the evolution of chlorine profile (Cl concentration (wt %)) with exposure time at 1900° C. in a fiber having core doped with chlorine and cladding doped with fluorine.
Figure 6B:
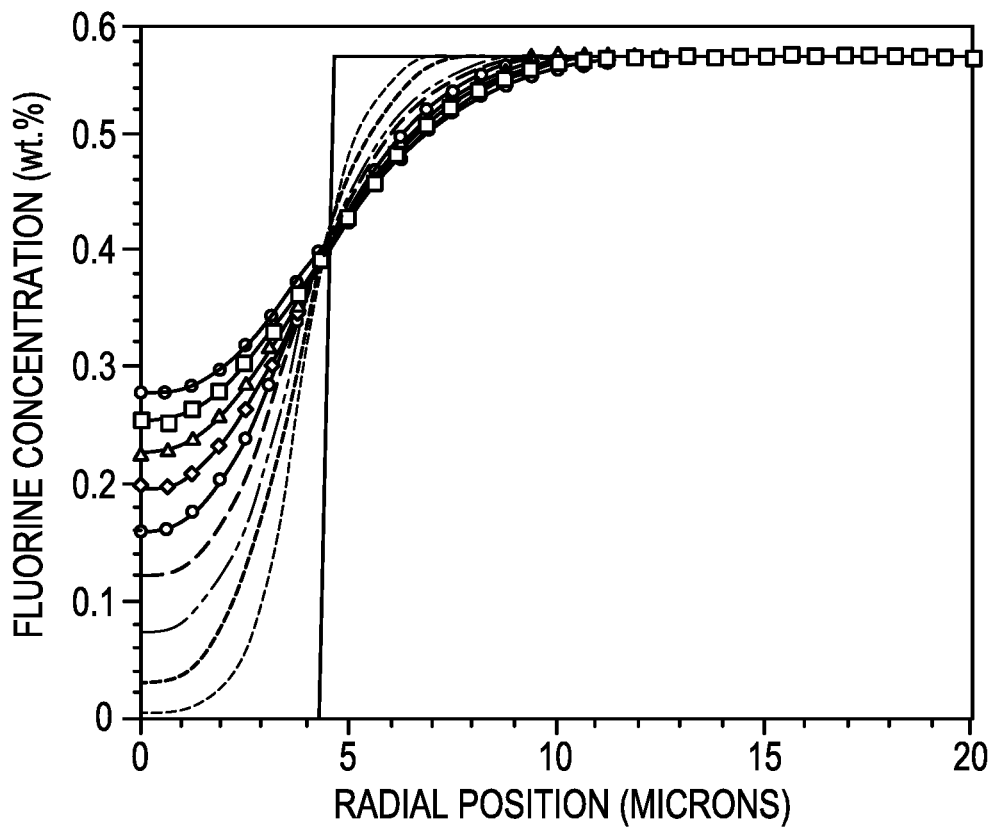
FIG. 6B illustrates the evolution of fluorine profile (F concentration (wt %)) with exposure time at 1900° C. in a fiber having core doped with chlorine and cladding doped with fluorine.
Figure 6C:
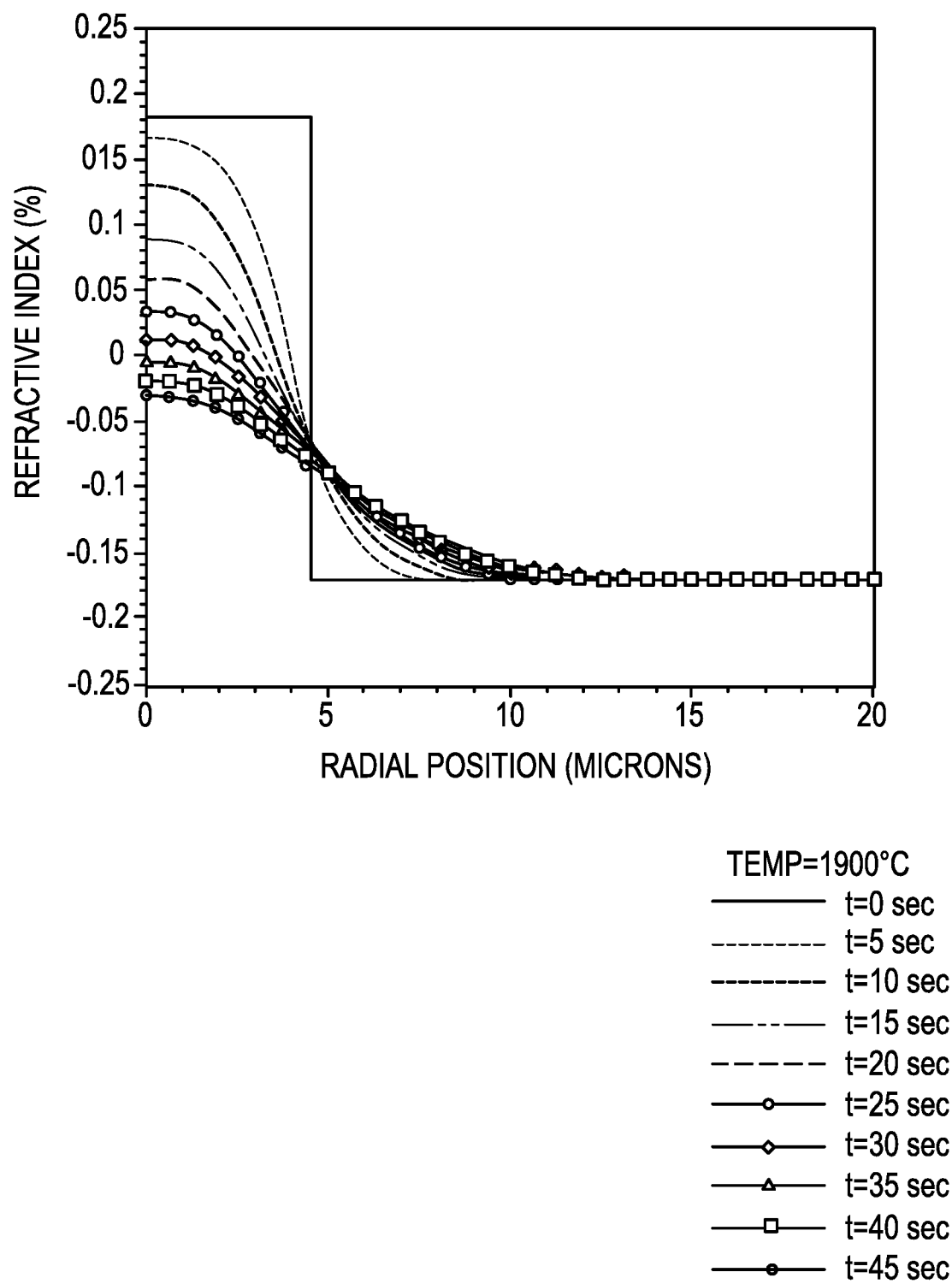
FIG. 6C illustrates the evolution of refractive index profile with exposure time at 1900° C. in a fiber having core doped with chlorine and cladding doped with fluorine.

FIGS. 6A-6C illustrate changes in the Cl/F concentrations within the fiber's core and cladding and changes in refractive index profile of the optical fiber when the optical fiber is subjected to a temperature Td (where Td is above the softening point of the fiber cladding layer) as a function of time. More specifically, FIGS. 6A-6B illustrate how Cl and F diffuse in silica at a temperature Td=1900° C.) in a fiber having chlorine doped silica based core and fluorine doped silica based cladding FIG. 6C illustrates the resultant relative refractive index delta profile of the fiber at location $D_{max}$, after the fiber is treated at the temperature of 1900° C. for less than 1 min of total time. More specifically, FIG. 6C illustrates evolution of refractive index profile with exposure time t at 1900° C. For example, FIG. 6C illustrates that the step of applying of heat may be performed for a total or cumulative time t where 1 sec<t<1 min, and in some embodiments for 3 sec to 45 sec (e.g., 1 sec<t≤30 sec, or 3 sec<t≤45 sec, or 3 sec<t≤30 sec, or 5 sec<t≤30 sec).

As can be seen from results presented in FIG. 6C, refractive index difference between the core and the cladding decreases and the radius of the core increases because of the diffusion of both chlorine and fluorine dopants (Cl defuses out, or away from the core center, and F diffuses out of the cladding, towards the center of the core, smoothing the transition between the core/cladding boundary. FIG. 6C illustrates that the refractive index profile in the cross sectional areas of the fiber that undergone thermally induced dopant diffusion changed, and is no longer a step index profile, It is noted that if the original fiber was not a step index fiber, but a graded index fiber (e.g., a fiber having a core with an alpha value of 1.8 to 3), such fiber when subjected to a temperature Td would also exhibit Cl diffusivity towards the edge that would decrease the refractive index of the core relative to the cladding, and increase the core size. These changes in refractive index profile results in expansion of the MFD required for the optical fiber (also referred to as jumper fiber herein), such as, for example, optical fibers 10.

Figure 7A:
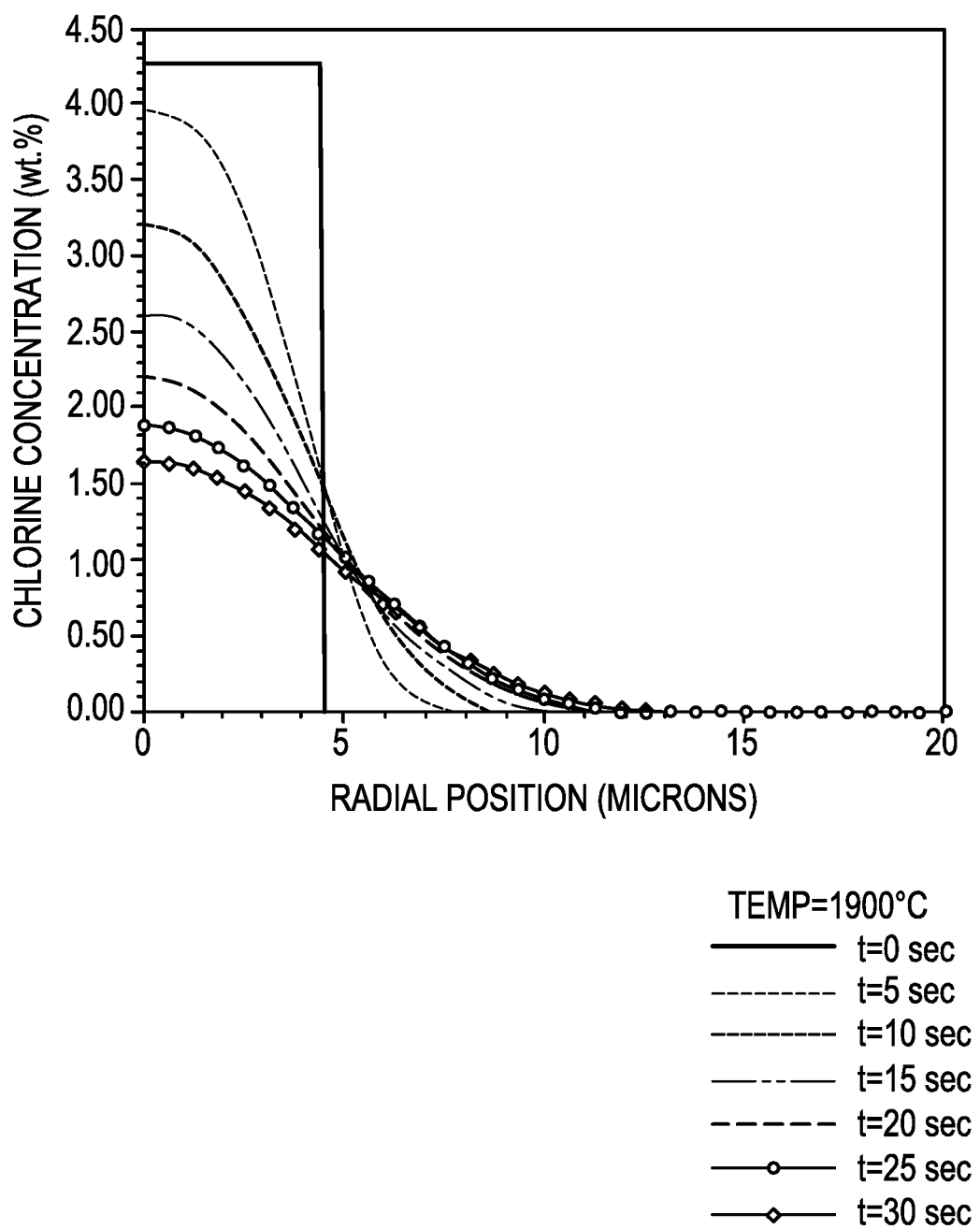
FIG. 7A illustrates the evolution of chlorine profile (Cl concentration (wt %)) with exposure time at 1900° C. in a fiber having core doped with chlorine core and undoped silica cladding.
Figure 7B:
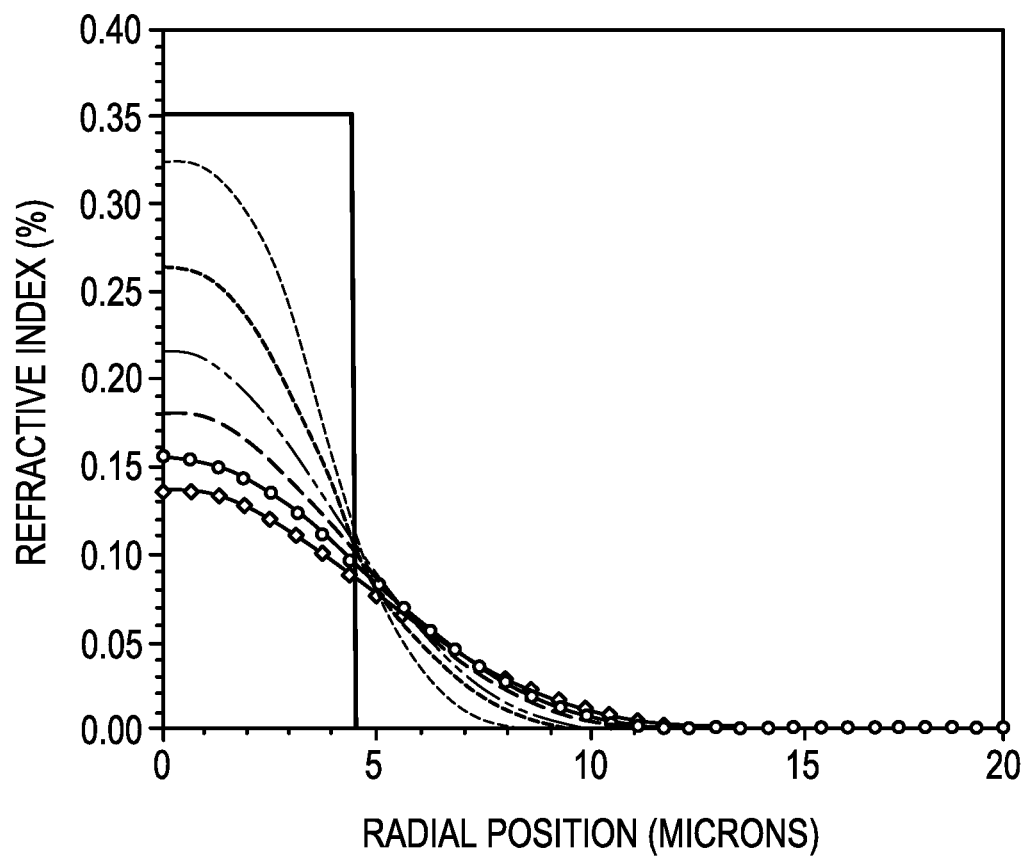
FIG. 7B illustrates the evolution of refractive index profile with exposure time at 1900° C. in a fiber having core doped with chlorine core and undoped cladding.

Similarly, FIG. 7A illustrate how Cl diffuses in silica at a temperature Td=1900° C.) in a fiber embodiment having chlorine doped silica-based core and undoped silica cladding. FIG. 7B illustrates the resultant relative refractive index delta profile of the fiber at location $D_{max}$, after the fiber is treated at the temperature of 1900° C. for less than 1 min (i.e., 1 sec<t<1 min). Similar results were also obtained at 1700° C. and 2100° C.

We discovered that when the optical fiber has a Cl doped core with Cl concentration of at least 0.5 wt %, we can create adiabatic tapers in less than 1 minute (e.g., 1 sec to 45 sec, e.g., 5 sec to 45 sec, 10 sec to 45 sec, 15 sec to 45 sec, or 5 sec to 30 sec, or 15 sec to 45 sec), at temperatures between about 1500° C., and about 2100° C., without creating undesirable deformation(s). Preferable temperature range is 1700° C. to 2100° C., and more preferably 1700° C. to 2000° C.

Figure 8A:
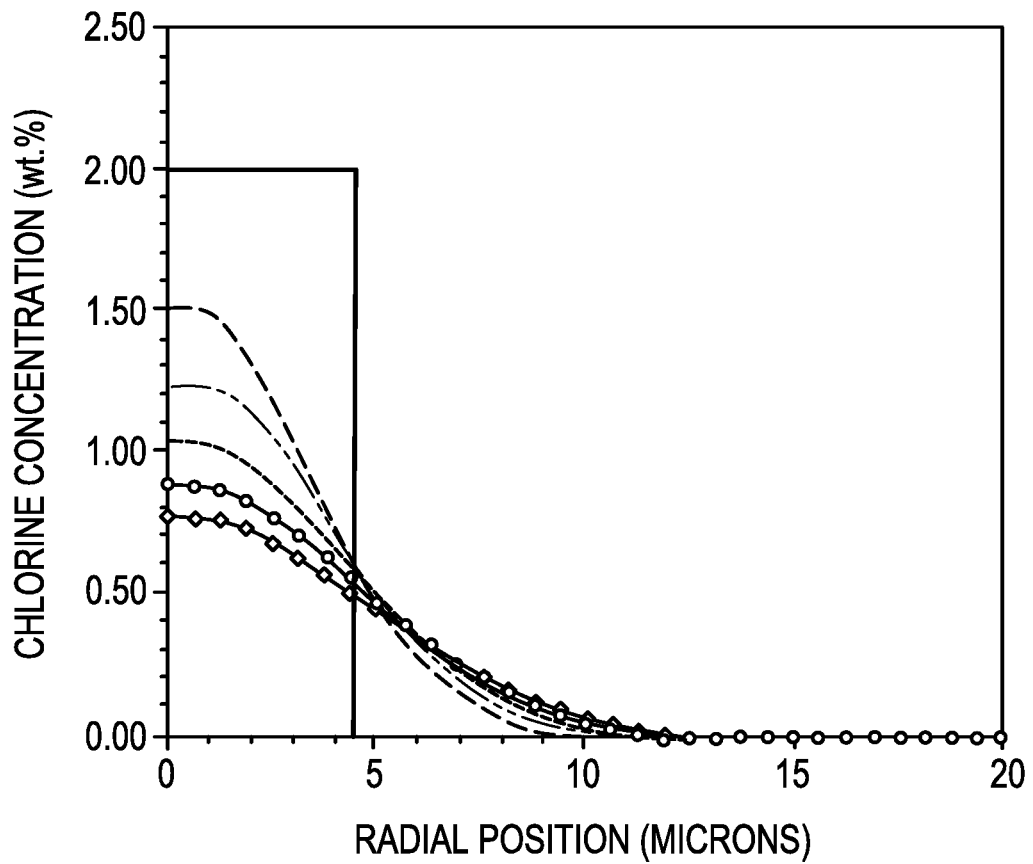
FIG. 8A illustrates the evolution of chlorine profile (Cl concentration (wt %)) with exposure time at 1900° C. in a fiber having core doped with chlorine and fluorine, and cladding doped with fluorine.
Figure 8B:
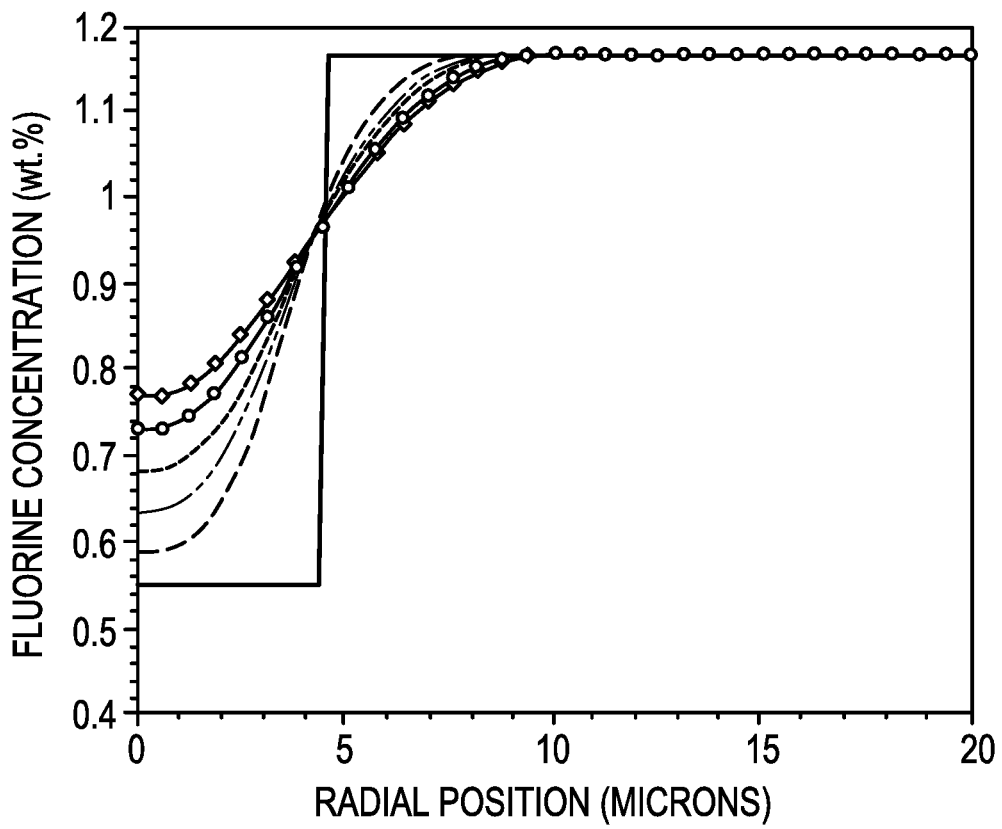
FIG. 8B illustrates the evolution of fluorine profile (F concentration (wt %)) with exposure time at 1900° C. in a fiber having core doped with chlorine and fluorine and cladding doped with fluorine.
Figure 8C:
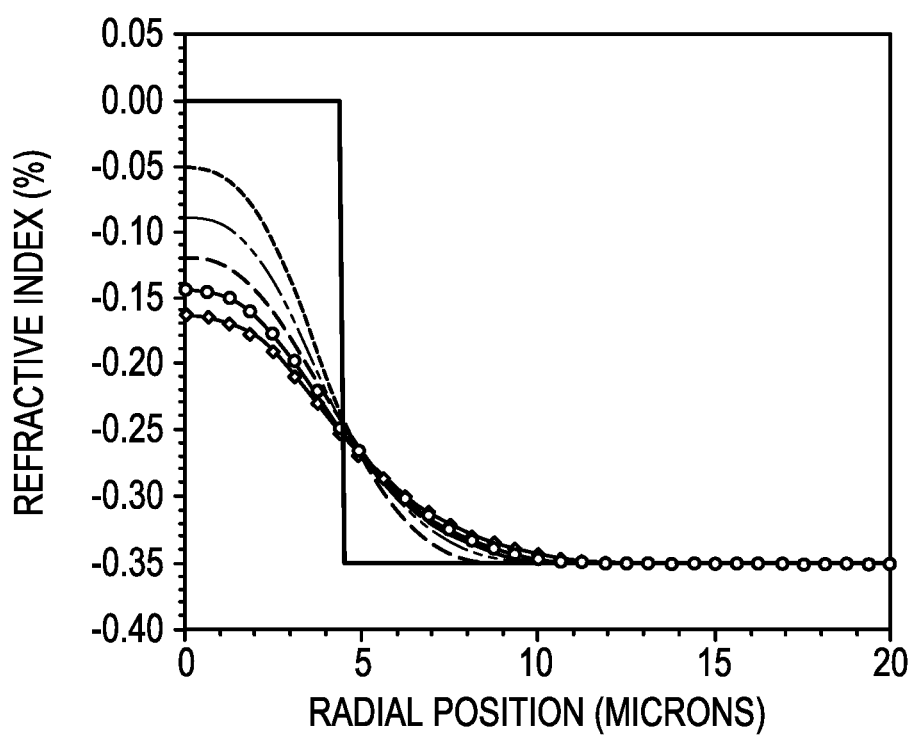
FIG. 8C illustrates the evolution of refractive index profile with exposure time at 1900° C. in a fiber having core doped with chlorine and fluorine and cladding doped with fluorine.

FIGS. 8A-8C depict changes in the Cl/F concentrations and in a refractive index profile of another fiber embodiment at temperatures Td. More specifically, FIGS. 8A-8B illustrate how Cl and F diffuse in silica at a temperature Td=1900° C. in a fiber having chlorine and fluorine doped silica based core and fluorine doped silica based cladding. FIG. 8C illustrates the resultant relative refractive index delta profile of the fiber at location $D_{max}$, after the fiber is treated at the temperature Td of 1900° C. for less than 1 min (i.e., 1 sec<t<1 min). Similarly, at temperatures Td that are above the softening point of the cladding layer of the fiber, the exposure times are less than 1 minute, and in some embodiments 45 seconds or less, less than 30 seconds in still other embodiments, and less than 15 seconds in yet other embodiments 5-15 seconds. We discovered that when the fiber has a Cl doped core with Cl concentration of at least 0.5 wt %, we can create adiabatic tapers in less than 1 minute (e.g., 1 sec to 45 sec), at temperatures Td between about 1500° C. and about 2100° C. (for example: 1800° C., 1850° C., 1900° C., 1950° C., 2000° C., or therebetween) without creating undesirable deformation(s).

Figure 9A:
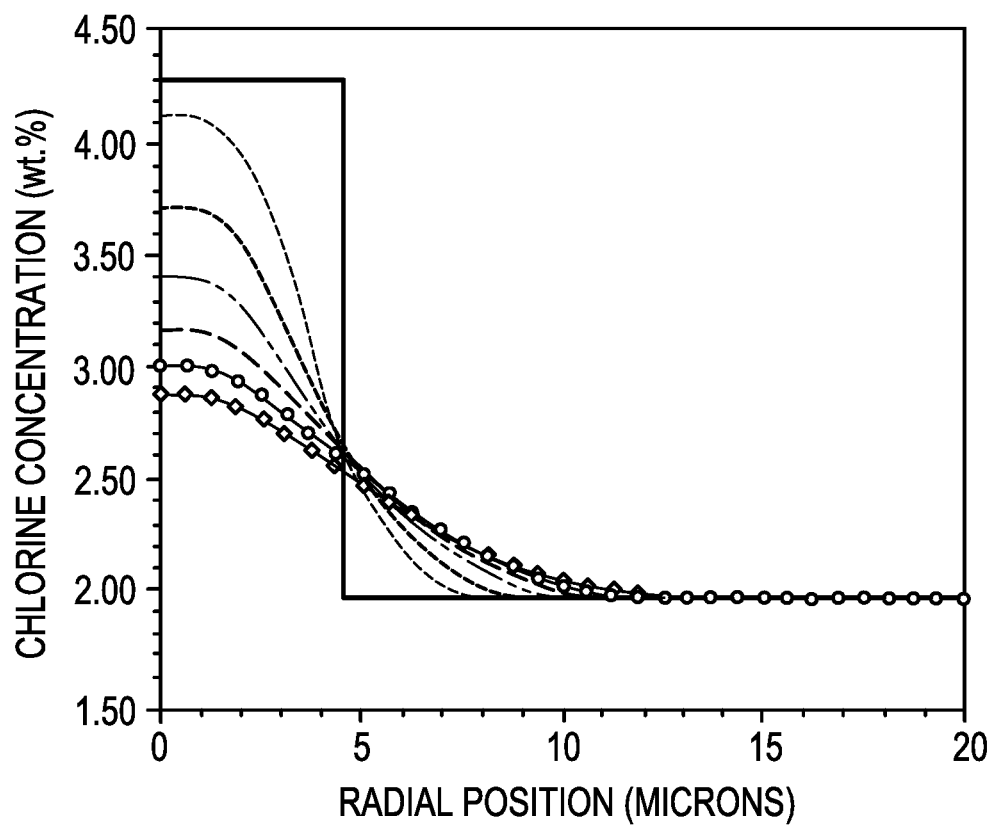
FIG. 9A illustrates the evolution of chlorine profile (Cl concentration (wt %) with exposure time at 1900° C. in a fiber having core doped with chlorine and cladding doped with chlorine and fluorine.
Figure 9B:
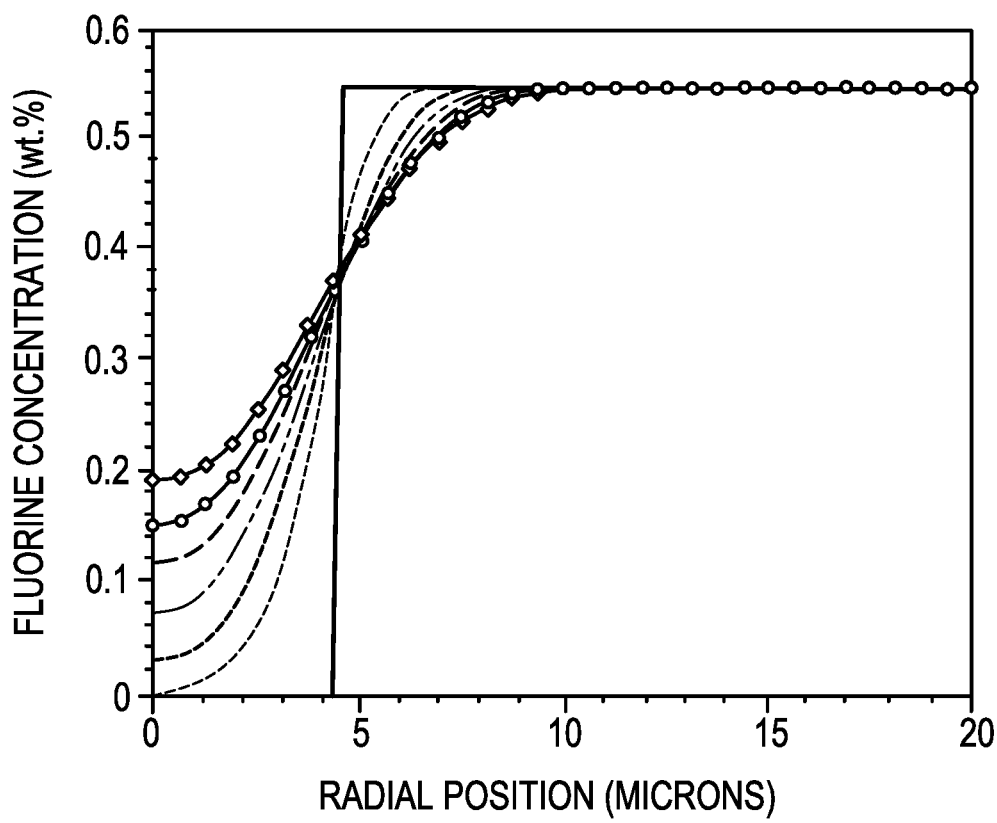
FIG. 9B illustrates the evolution of fluorine profile (F concentration (wt %) with exposure time at 1900° C. in a fiber having core doped with chlorine and cladding doped with chlorine and fluorine.

FIGS. 9A-9C correspond to changes in the Cl/F concentrations and refractive index profile at temperatures Td where Td is above the softening point of the fiber cladding layer. More specifically, FIGS. 9A-9B illustrate how Cl and F diffuse in silica at a temperature Td=1900° C.) in a fiber having a chlorine doped silica-based core and chlorine and fluorine doped silica-based cladding, and FIG. 9C illustrates the resultant relative refractive index delta profile of the fiber at location $D_{max}$, after the fiber is treated at the temperature of 1900° C. for less than 1 min (i.e., 1 sec<t<1 min). We discovered that when the fiber has Cl doped core with Cl concentration of at least 0.5 wt %, we can create adiabatic tapers in less than 1 minute (e.g., 1 sec to 45 sec), at temperatures between about 1500° C.,° and about 2100° C., without creating undesirable deformation(s).

The optical fibers 10 described herein are suitable for efficient coupling of optical signals to an optical assembly. The optical assembly may comprise multiple optical components (e.g., 3, 4, 5, or more) that are spatially separated from one another. According to at least some embodiments disclosed herein, the optical fiber 10 includes a Cl doped tapered core region 24 with a changing outer diameter and changing maximum core refractive index to provide improved coupling at wavelengths of interest to optical assemblies. The optical assemblies may comprise, for example, an optical collimator, an optical collimator array unit, an optical filter device (e.g., multiport filter device), a wavelength-division multiplexing unit, or variable attenuator. The optical assembly may operate, for example, at an operating wavelength λ that is at or near 1310 nm.

The present disclosure extends to optical systems (e.g., an integrated systems) 500 that incorporate the optical fibers 10. In one embodiment, the optical system 500 includes an optical signal source (for example a laser light source 50, e.g., a laser or LED), an optical assembly 200, and the optical fiber 10. In one embodiment, the light source 50 operates at a wavelength at or near 1310 nm (e.g., in the range from 1250 nm to 1350 nm, or in the range from 1260 nm to 1325 nm, or in the range from 1275 nm to 1325 nm, or in the range from 1290 nm to 1320 nm, or in the range from 1200 nm to 1400 nm). In another embodiment, the light source 50 operates at a wavelength at or near 1550 nm (e.g., in the range from 1500 nm to 1580 nm).

The optical assembly 200 may be coupled to the optical fiber 10 with a tapered core 24) for exchanging optical signals between the optical assembly and another (optional) optical fiber 105. The system 500 includes an optical fiber 10 of the type disclosed herein. In some embodiments the optical fiber 105 is coupled directly to optical assembly 200 through the optical fiber 10. The optical assembly 200 of the optical system 500 may be devices or components such as modulators, detectors, multiplexers, demultiplexers, etc. An exemplary embodiment of a wavelength division multiplexer optical assembly 200 coupled to optical fibers 10 is shown in FIG. 3.

The large mode field diameters provided by the optical fibers 10 described herein reduce coupling losses between the optical fibers and optical assemblies 200.

According to some embodiments, system 500 comprises an optical assembly 200 and at least one optical fiber 10, but does not include the optical fiber 105. In such embodiments the length of the optical fiber 10 is longer, because the length L1 of the fiber 10 serves the function of the fiber 105, and the core portion with the outer diameter $D_0$ in the core region 22 serves same the function as the core 106 of the optical fiber 105.

Referring again to FIGS. 2C and 2D, according to one embodiment, the optical system comprises:

an optical assembly 200 optically coupled to at least one optical fiber 10, the optical fiber comprising:

(a) Cl doped silica based tapered core region 24, the core region 24 having an outer diameter Dc that changes along the length $L_2$ of the tapered core region 24 and a maximum outer diameter $D_{max}$ such that 8 microns≤$D_{max}$≤70 microns; the tapered core region 24 further comprising a maximum core refractive index, Δc that decreases along the length of the tapered core region; and (b) a silica based cladding 40 surrounding the fiber core. Preferably the cladding has a constant outer diameter throughout the length of the fiber. The optical assembly preferably includes multiple sirspaced optical components (for example at least 2, at least 3 at least 4 or at least 5 optical components.) These optical components may be, for example, refractive or reflective optical components, and may include optical components that comprise optical coatings. The optical system may further include a laser source 50 (also referred to herein as the optical signal source). The laser source 50 may be coupled to the optical assembly 200. The optical assembly 200 may be situated between the laser source 50 and the optical fiber 10. In some embodiments the optical assembly 200 may be situated between a plurality of laser sources 50 and a plurality of the optical fibers 10.

According to one embodiment an optical system 500 comprises:

an optical assembly 200 comprising a first optical surface and a rear optical surface, said optical assembly 200 comprising at least three optical elements E1-E3, an optical fiber 10 comprising an end face 12 and an adjacent core portion with a field expanded region optically coupled to the rear optical surface of the optical assembly, the optical fiber 10 comprising a core region doped with chlorine in a concentration greater than 0.5 wt %, and wherein the mode field expanded region is less than 5 cm in length, and the optical fiber 10 having, at an operating wavelength λ, a mode field diameter at the fiber end coupled to the optical assembly that is a least 20% greater than the optical fiber mode field diameter at other end of the optical fiber; and an optical signal source 50 coupled to first optical surface of the optical assembly, such that the optical signal provided by the optical signal source 50 is routed along an optical path formed by the optical assembly 200 to the fiber end face 12 of the optical fiber 10.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical system comprising:
(i) an optical assembly comprising a first optical surface and a rear optical surface, said optical comprising at least three optical elements,
(ii) an optical fiber comprising a core portion with a field expanded region optically coupled to the rear optical surface of the optical assembly, the optical fiber comprising a core region doped with chlorine in a concentration greater than 0.5 wt %, and wherein the mode field expanded region is less than 5 cm in length, and the optical fiber having, at an operating wavelength λ, a mode field diameter at the fiber end coupled to the optical assembly that is a least 20% greater than the optical fiber mode field diameter at other end of the optical fiber; and
(iii) an optical signal source coupled to first optical surface of the optical assembly, such that the optical signal provided by the optical signal source is routed along an optical path formed by the optical assembly to the field expanded region of said optical fiber.

2. The optical system of claim 1, wherein said tapered core region has a taper profile, said taper profile being one of: linear, parabolic, exponential, or gaussian taper.

3. An optical system comprising:
(A) the optical fiber comprising: a length L, a first end face and a second end face, and a MFD at the first end face of the fiber that is different from MFD at another region of the fiber, the fiber further comprising:
(I) a first Cl doped silica based core comprising:
(a) a first Cl doped core region having a maximum refractive index $\Delta_0$ such that 0.05%≤$\Delta_0$≤0.6% (relative to undoped silica), and an outer core diameter $D_0$, wherein 5 microns≤$D_0$≤12 microns, said first Cl doped core region having maximum Cl concentration [Cl], where 0.5 wt. %≤[Cl]≤5 wt. %; and
(b) a Cl doped tapered core region situated adjacent to the first Cl doped core region and to the first fiber end face, the Cl doped tapered core region having a length $L_2$ where 0.05 mm≤$L_2$≤50 mm, and a maximum core refractive index Δc that decreases along the length of the tapered core region, the tapered region having an outer diameter that changes along the length $L_2$ and a maximum diameter $D_{max}$, such that $$D_{max} \geq D_0 + 3 \text{ microns;} \qquad (i)$$

$$8 \text{ microns} \leq D_{max} \leq 70 \text{ microns; and} \qquad (ii)$$

(II) a silica based cladding surrounding the Cl doped silica based core;
(B) an optical assembly comprising a plurality of optical elements coupled to the Cl doped tapered core region of the optical fiber;
(C) another optical fiber coupled to said a first Cl doped core region.

4. The optical system of claim 3, wherein said optical fiber with the first Cl doped core region is sandwiched between said optical assembly and said another optical fiber.

5. The optical system of claim 3, wherein:
the first Cl doped core region has a length $L_1$, and the maximum refractive index $\Delta_0$ of the first Cl doped core region is constant along the length $L_1$, and the outer core diameter $D_0$ of the first Cl doped core region is constant along the length $L_1$, wherein $L_1 > 12$ cm.

6. The optical system of claim 5 wherein said tapered core region has a substantially adiabatic taper and satisfies the following condition:

$$\frac{dD}{dz} \leq 2\frac{D}{\lambda}(n_{eff} - n_{cl})$$

where D is the core diameter at a position z within the tapered core region, λ is the operating wavelength, $n_{eff}$ is the effective index of the fundamental mode, and $n_{cl}$ is the refractive index of the cladding.

7. The optical system of claim 6, wherein λ is: 1550 nm, or 1310 nm, or 980 nm.

8. The optical system of claim 5, wherein $L_2$ is 0.05 mm≤$L_2$≤1 mm.

9. The optical system of claim 5, wherein $L_2$ is 0.05 mm≤$L_2$≤1 mm, wherein $L_2$ is 0.2 mm≤$L_2$≤5 mm.

10. The optical system of claim 5 wherein $L_2$ is 0.05 mm≤$L_2$≤1 mm, wherein 10 microns/mm≤$(D_{max}-D_0)/L_2$≤100 microns/mm.

11. The optical system of claim 5, wherein $L_2$ is 0.05 mm≤$L_2$≤1 mm, wherein 14 microns/mm≤$(D_{max}-D_0)/L_2$≤86 microns/mm.

12. The optical system of claim 5, wherein $L_2$ is 0.05 mm≤$L_2$≤1 mm, wherein 14 microns/mm≤$(D_{max}-D_0)/L_2$≤35 microns/mm.

13. The optical system of claim 3, wherein said optical fiber has MFD at the first end face of the fiber that is different from the MFD at the second end face of the optical fiber.

14. The optical system of claim 3, wherein the cladding includes fluorine, and the fiber length L of said optical fiber with the first Cl doped core region is less than 100 m.

15. The optical system of claim 3, wherein said core contains at least one region with Cl concentration between 1.1 wt. % and 5 wt. %.

16. The optical system of claim 3, wherein said core contains at least one region with Cl concentration between 1.4 wt. % and 5 wt. %.

17. The optical system of claim 3, wherein 0.0%≤|Δc (at $D_{max}$)|≤0.3%, relative to undoped silica.

18. The optical system of claim 3, wherein 0.0%≤|Δ$c_x$ (at $D_{max}$)|≤0.2%, relative to undoped silica.

19. The optical system of claim 3, wherein 0.15%≤[$Δ_0-Δc$ (at $D_{max}$)]≤0.37%.

20. The optical fiber of claim 3, wherein the tapered core region has a taper induced loss of: (a) ≤0.2 dB at 1550 nm; or (b)≤0.2 dB at 1310 nm; or (c)≤0.1 dB at 1310 nm.

21. An optical system comprising:
a light source,
an optical assembly comprising a plurality of optical elements, said optical assembly coupled to the light source
an optical fiber comprising a tapered core region coupled to said optical assembly, said optical fiber comprising:
(a) the tapered core region comprising Cl and having an outer diameter Dc that changes along the length $L_2$ of the tapered core region and a maximum outer diameter $D_{max}$ such that 8 microns≤$D_{max}$≤70 microns; the tapered core region further comprising a maximum core refractive index Δc that decreases along the length $L_2$ of the tapered core region; and
(b) a silica based cladding surrounding the core region; and
a single mode fiber optically coupled to the optical fiber comprising a tapered core region.

22. The optical system according to claim 21, wherein said optical assembly comprises at least 3 optical elements and said optical elements are chosen from a group comprising mirrors, lenses, optical signal router(s), filters or combination thereof.

* * * * *

UNITED STATES PATENT AND TRADEMARK OFFICE
CERTIFICATE OF CORRECTION

PATENT NO. : 11,320,594 B2
APPLICATION NO. : 17/010169
DATED : May 3, 2022
INVENTOR(S) : Dong Gui et al.

It is certified that error appears in the above-identified patent and that said Letters Patent is hereby corrected as shown below:

In the Claims

In Column 22, Line 5, in Claim 20, delete "(b)$\leq$0.2" and insert -- (b) $\leq$0.2 --.

In Column 22, Line 5, in Claim 20, delete "(c)$\leq$0.1" and insert -- (c) $\leq$0.1 --.

Signed and Sealed this
Nineteenth Day of July, 2022

Katherine Kelly Vidal
*Director of the United States Patent and Trademark Office*